(12) United States Patent
Calderwood et al.

(10) Patent No.: US 9,977,583 B2
(45) Date of Patent: May 22, 2018

(54) SYSTEM, METHOD AND APPARATUS FOR DISPLAYING A NON-BIASING AND SELF-ADJUSTING VISUAL ANALOG SCALE ON A COMPUTING DEVICE

(71) Applicant: eResearchTechnology, Inc., Philadelphia, PA (US)

(72) Inventors: William A. Calderwood, Amesbury, MA (US); Stephen A. Raymond, Kailua Kona, HI (US); Gulden Saricali, Jamaica Plain, MA (US); Batya Vis, Winthrop, MA (US)

(73) Assignee: ERESEARCHTECHNOLOGY, INC., Philadelphia, PA (US)

( * ) Notice: Subject to any disclaimer, the term of this patent is extended or adjusted under 35 U.S.C. 154(b) by 156 days.

(21) Appl. No.: 14/670,261

(22) Filed: Mar. 26, 2015

(65) Prior Publication Data
US 2016/0284058 A1    Sep. 29, 2016

(51) Int. Cl.
*G06T 17/00*    (2006.01)
*G06F 3/0484*    (2013.01)
*G06T 3/40*    (2006.01)
*G09G 5/14*    (2006.01)
*G09G 5/32*    (2006.01)

(52) U.S. Cl.
CPC ........ *G06F 3/04847* (2013.01); *G06T 3/4007* (2013.01); *G09G 5/14* (2013.01); *G09G 5/32* (2013.01); *G09G 2340/12* (2013.01); *G09G 2340/14* (2013.01)

(58) Field of Classification Search
CPC .. G06F 19/363; G06F 19/322; G06F 19/3437; G06F 19/3487; G06F 3/04847; G06Q 10/10; G06Q 50/24; G06T 3/4007
See application file for complete search history.

(56) References Cited

U.S. PATENT DOCUMENTS 5,533,514 A    7/1996 Lavigne et al.
5,778,882 A    7/1998 Raymond et al.
(Continued)

FOREIGN PATENT DOCUMENTS

WO    WO-9625877 A2    8/1996

OTHER PUBLICATIONS

Author unknown; Visual Analog Scale—VAS Rulers; Jan. 27, 2010; www.schlenkerenterprises.com/vas_medical_rulers.htm.*
(Continued)

*Primary Examiner* — Peter Hoang
(74) *Attorney, Agent, or Firm* — Wilson, Sonsini, Goodrich & Rosati, PC

(57) ABSTRACT

A system and method for displaying a non-biasing VAS that automatically adjusts to different screen aspect ratios/resolutions of a computing device, while preserving the reliability of the VAS. The system and method can calculate a number of pixels available on a screen display to display a VAS. Further, the system and method can generate a VAS comprising equally sized intervals of distance to fit the available screen display. In addition, the system and method can include an anchor line at each end of the VAS that indicates an upper and lower value of a range of values measured by the VAS. The system and method can also include a unit cursor on the VAS that allows a subject to indicate, by pixel, interval or target area, a position on the VAS.

18 Claims, 14 Drawing Sheets

(56) References Cited

U.S. PATENT DOCUMENTS

| | | | |
|---|---|---|---|
| 6,095,985 | A | 8/2000 | Raymond et al. |
| 6,282,441 | B1 | 8/2001 | Raymond et al. |
| 6,440,069 | B1 | 8/2002 | Raymond et al. |
| 6,456,305 | B1 * | 9/2002 | Qureshi ............ G06F 17/30905 707/E17.121 |
| 6,640,134 | B2 | 10/2003 | Raymond et al. |
| 6,879,970 | B2 | 4/2005 | Shiffman et al. |
| 7,273,454 | B2 | 9/2007 | Raymond et al. |
| 7,415,447 | B2 | 8/2008 | Shiffman et al. |
| 7,873,589 | B2 | 1/2011 | Shiffman et al. |
| 8,046,241 | B1 | 10/2011 | Dodson |
| 8,065,180 | B2 | 11/2011 | Hufford et al. |
| 8,145,519 | B2 | 3/2012 | Hufford et al. |
| 8,273,019 | B2 | 9/2012 | Crowley et al. |
| 8,380,531 | B2 | 2/2013 | Paty et al. |
| 8,433,605 | B2 | 4/2013 | Hufford et al. |
| 8,533,029 | B2 | 9/2013 | Hufford et al. |
| 9,075,900 | B2 | 7/2015 | Wilson et al. |
| 9,129,215 | B2 | 9/2015 | Shiffman et al. |
| 9,483,618 | B2 | 11/2016 | Brincat et al. |
| 2002/0089546 | A1 * | 7/2002 | Kanevsky ................ G09G 5/14 715/800 |
| 2002/0156640 | A1 | 10/2002 | Hufford et al. |
| 2009/0281829 | A1 | 11/2009 | Hansen et al. |
| 2013/0157244 | A1 | 6/2013 | Eger et al. |
| 2013/0159010 | A1 | 6/2013 | Paty et al. |
| 2013/0218541 | A1 | 8/2013 | Dodson |
| 2013/0268287 | A1 | 10/2013 | Hufford et al. |
| 2014/0108032 | A1 | 4/2014 | Hufford et al. |
| 2015/0178473 | A1 | 6/2015 | Hufford et al. |
| 2015/0178474 | A1 | 6/2015 | Hufford et al. |
| 2016/0034541 | A1 | 2/2016 | Shiffman et al. |

OTHER PUBLICATIONS

Office Action dated Sep. 28, 2016 for U.S. Appl. No. 14/792,126.
Office Action dated Oct. 13, 2016 for U.S. Appl. No. 14/579,670.
Office Action dated Nov. 16, 2016 for U.S. Appl. No. 13/688,962.
20 Most Promising Data Integration Solution Providers 2015. CIO Review, Dec. 2015 (1 pg.).
Adar, et al. A thorough QT study to assess the effects of tbo-filgrastim on cardiac repolarization in healthy subjects. Drug Des Devel Ther. 2015;9:2653-2662.
Baldwin, et al. Evaluation of an Electronic Daily Diary for Measuring Morning Symptoms in Chronic Obstructive Pulmonary Disease. ATS Conference Presented Poster, May 2013 (1 pg.).
Begg, et al. Assessment of Post-Surgical Recovery after Discharge using a Pen Computer Diary. Anaesthesia 2003;58:1101-1118.
Bjorner, et al. Difference in method of administration did not significantly impact item response: an IRT-based analysis from the Patient-Reported Outcomes Measurement Information System (PROMIS) initiative. Qualitative Life Research 2013;23(1):217-227.
Broderick, et al. Signaling Does Not Adequately Improve Diary Compliance. Annals of Behavioral Medicine 2003;26(2):139-148.
Chontos. ERT Opens Boston-based Innovation Labto Advance Patient-Centric Research. CenterWatch Weekly, Feb. 2016 (6 pgs).
Coons, et al. Recommendations on evidence needed to support measurement equivalence between electronic and paper-based patient-reported outcome (PRO) measures: ISPOR ePRO Good Research Practices Task Force report. Value Health. Jun. 2009;12(4):419-29. Epub Nov. 11, 2008.
Co-pending U.S. Appl. No. 11/002,046, filed Jan. 12, 2014.
Craig. eCOA Regulatory Inspections: Best Practices for Smooth and Successful Outcomes. White Paper. Oct. 2013 (10 pgs).
Dallabrida, et al. International Clinical Trials. Smart Thinking. Samedan Ltd. Pharmaceutical Publishers. Jul./Aug. 2015 (5 pgs).
Dallabrida. White Paper. eCOA Increases Patient-Site Communication and Candor. (Mar. 2016) (5 pgs).
Dijk, et al. Age-Related Reduction in Daytime Sleep Propensity and Nocturnal Slow Wave Sleep. SLEEP 2010; 33(2):211-223.
ERT®. Which collection method for COA data will best support your trial, Paper or eCOA? (2016) (1 pg).
ERT®. Case Study Evidence: Reduced Standard Deviation With Electronic PRO. (2015) (4 pgs).
ERT®. Clinical Outcome Assessments: Planning for Success. White Paper. Jun. 2013 (6 pgs).
European Medicines Agency (EMEA). Reflection Paper on the Regulatory Guidance for the Use of Health-Related Quality of Life (HRQL) Measures in the Evaluation of Medicinal Products. EMA, Jul. 2005 (5 pgs).
Exell, et al. A Novel Electronic Application of Patient-reported Outcomes in Multiple Sclerosis—Meeting the Necessary Challenge of Assessing Quality of Life and Outcomes in Daily Clinical Practice. European Neurological Review 2014;9(1):49-55.
FDA. Measurement in Clinical Trials: Review and Qualification of Clinical Outcome Assessments. FDA Public Workshop, Oct. 2011 (424 pgs).
Feldman et al. Best Practices for Streamlining Electronic Implementation of Established COAs. White Paper. Jan. 2015 (5 pgs).
Feldman, et al. Prediction of peak flow values followed by feedback improves perception of lung function and adherence to inhaled corticosteroids in children with asthma. Thorax 2012;67:1040-1045.
Gendreau, et al. Measuring clinical pain in chronic widespread pain: selected methodological issues. Best Practice & Research Clinical Rheumatology 2003;17(4):575-592.
Grataloup et al. Testing the Usability of e-Pro Translations during Linguistic Validation: Cognitive Interviews on 3-Device vs. Print out of Screenshot. ISPOR, Nov. 2010 (1 pg.).
Greist, et al. Electronic Assessment of Suicidal Ideation and Behavior for Meta-Analyses across Multiple Trials and Treatment Indications. International Society for CNS Trials and Methodology Presented Poster, Feb. 2013 (1 pg.).
Greist et al. Predictive Value of Baseline electronic Columbia-Suicide Severity Rating Scale (eC-SSRS) Assessments for Identifying Risk of Prospective Reports of Suicidal Behavior During Clinical Research. Innovations in Clinical Neuroscience 2014;11(9-10):23-31.
Greist et al. Predictive Value of eC-SSRS Suicide Risk Assessment Questions during Psychiatric and Non-Psychiatric Clinical Trials based on Lifetime Reports of Suicidal Ideation and Behavior at Baseline. CNS Summit Presented Poster, Nov. 2013 (1 pg.).
Gwaltney, et al. Equivalence of electronic and paper-and-pencil administration of patient-reported outcome measures: a meta-analytic review. Value Health. 2008; 11:322-333.
Gwaltney et al. Interactive Voice Response and Tablet Self-Report Versions of the Electronic Columbia-Suicide Severity Rating Scale are Equivalent. CNS Summit Presented Poster, Nov. 2014 (1 pg.).
Gwaltney, et al. Patient Reported Outcome Data Collection via Bring Your Own Device (BYOD) Approach: Key Benefits and Considerations for Clinical Development. White Paper. Jan. 2014 (5 pgs).
Hall, et al. Why Rater Training Matters in Clinical Trials: A Science Overview. Clinical Leader, Mar. 2015 (2 pgs).
Hufford, et al. Correspondence between paper and electronic visual analog scales among adult asthmatics. Invivodata. Nov. 9, 2001 (5 pgs).
Jamison, et al. Comparative study of electronic vs. paper VAS ratings: a randomized, crossover trial using healthy volunteers. Pain. Sep. 2002;99(1-2):341-7.
Joslyn, et al. Identification of Cardinal Symptoms in Patients with Chronic Idiopathic Constipation. Digestive Disease Week, May 2012 (1 pg.).
Khan. Assessing Suicidality in Clinical Trials: Paxil's Wakeup Call. Applied Clinical Trials, Sep. 2015 (3 pgs).
Kleiman. A Primer on Collecting Cardiac Safety Data during Drug Development. White Paper. Nov. 2014 (13 pgs).
Kleiman, et al. A Novel Approach to QTc Studies: Assessing Cardiac Safety of the mTOR Kinase Inhibitor CC-223 within the Dose-Escalation/Expansion Study. Blood 2015 126:5555.
Kleiman, et al. Benefits of Centralized ECG Reading in Clinical Oncology Studies. Therapeutic Innovation & Regulatory Science 2016;50(1):123-129 (Epub Aug. 2015).

(56) References Cited

OTHER PUBLICATIONS

Kleiman, et al. Replacing the thorough QT study: reflections of a baby in the Bathwater. British Journal of Clinical Pharmacology 2013;78(2):195-201.
Kleiman. In Oncology Trials, Every Subject Counts. Applied Clinical Trials, Dec. 4, 2015 (3 pgs.).
Kleiman. Quantitative T-Wave Morphology Analysis: A New Method for Evaluating Risk of Proarrhythmia Key Benefits. White Paper. Jul. 2014 (9 pgs).
Kleiman. The Use of Ambulatory Blood Pressure Monitoring in Drug Development. White Paper. Jan. 2015 (10 pgs).
Kleiman. The Use of Continuous ECG Recordings (Holters) in Drug Development. White Paper. Dec. 2014 (5 pgs.).
Kleinman. Why is Cardiac Safety Testing Required for Non-Cardiac Drugs? White Paper. Aug. 2014.
Kulich et al. Symptoms and Impact of COPD Assessed by an Electronic Diary in Patients with Moderate-to-Severe COPD: Psychometric Results from the SHINE Study. Int J Chron Obstruct Pulmon Dis. Jan. 7, 2015;10:79-94.
Lebwohl et al. The Psoriasis Symptom Diary: development and content validity of a novel patient-reported outcome instrument. Int J Dermatol 2014;53(6):714-722.
Litwin, et al. A thorough QT study to evaluate the effects of therapeutic and supratherapeutic doses of delafloxacin on cardiac repolarization. Antimicrob Agents Chemother. 2015;59(6):3469-73 (Epub Apr. 6, 2015).
Louie. Vendor Assessment: IDC Short List—2010 Electronic Patient Reported Outcome eClinical Solutions. IDC Health Insights, Dec. 2010 (25 pgs).
McHorney, et al. Review of Adherence Measures for Use in Phase IV Studies and Recommendations for a New Standardized Generic Measure. ISPOR EU Presented Poster, Nov. 2015 (1 pg.).
McHorney. Patient-Centered Reasons for Primary Non-Adherence (Medication Non-Fulfillment) as Derived from the Peer-Reviewed Literature. ISPOR EU Presented Poster, Nov. 2015 (1 pg.).
Min et al. Evaluation of ventricular arrhythmias in early clinical pharmacology trials and potential consequences for later development. American Heart Journal 2010;159(5):716-729.
Morganroth, et al. Moxifloxacin-induced QTc interval prolongations in healthy male Japanese and Caucasian volunteers: a direct comparison in a thorough QT study. Br J Clin Pharmacol. Sep. 2015;80(3):446-59 (Epub Jul. 2, 2015).
Mundt, et al. Comparing Clinician-rated C-SSRS with Computer-administered eC-SSRS (Ver 2.0): Replication and Extension of Prior Research Findings. ISCTM Conference Presented Poster, Oct. 2013 (1 pg.).
Mundt et al. eC-SSRS Assessments of Lifetime Ideation and Behavior are Predictive of Suicidal Behaviors Occurring During Trial Participation. International Society for CNS Trials and Methodology Presented Poster, Oct. 2011 (1 pg.).
Mundt et al. Electronic Administration of the Columbia-Suicide Serverity Rating Scale(eC-SSRS): Results from 14,937 Administrations. International Society for CNS Trials and Methodology Presented Poster, Oct. 2010 (1 pg).
Mundt, et al. Feasibility and validation of a computer-automated Columbia-Suicide severity rating scale using interactive voice response technology. Journal of Psychiatric Research 2010;44(16):1224-1228 (Epub Jun. 2010).
Mundt, et al. Prediction of Suicidal Behavior in Clinical Research by Lifetime Suicidal Ideation and Behavior Ascertained by the Electronic Columbia-Suicide Severity Rating Scale. Journal of Clinical Psychiatry 2013;79(9):887-893.
Mundt, et al. Risk of Prospective Suicidal Behavior Reports among Psychiatric and non-Psychiatric Patients using Lifetime Reports at Baseline. International Society for Cns Trials and Methodology Presented Poster, Feb. 2013 (1 pg.).
Mundt, et al. Validation of an Electronic Columbia-Suicide Severity Rating Scale using Interactive Voice Response Technology. NCDEU Presented Poster, Jun. 2010 (1 pg.).
Munz. Driving Change Through eCOA Innovation. Applied Clinical Trials, Oct. 2015 (2 pgs.).
Neri. Complying with the ICH E6 (R2) Addendum: Six Steps to Ensuring Risk-based Quality Management. White Paper. May 2016 (6 pgs).
Office action dated Jan. 3, 1996 for U.S. Appl. No. 08/394,157.
Office action dated Jan. 4, 2012 for U.S. Appl. No. 12/177,540.
Office action dated Jan. 8, 2008 for U.S. Appl. No. 11/002,046.
Office action dated Jan. 25, 2016 for U.S. Appl. No. 14/792,126.
Office action dated Jan. 26, 2007 for U.S. Appl. No. 09/840,730.
Office action dated Jan. 29, 2009 for U.S. Appl. No. 09/840,730.
Office action dated Feb. 7, 2006 for U.S. Appl. No. 10/693,232.
Office action dated Feb. 9, 2006 for U.S. Appl. 09/825,533.
Office action dated Feb. 10, 1997 for U.S. Appl. No. 08/394,157.
Office action dated Feb. 19, 2010 for U.S. Appl. No. 11/844,632.
Office action dated Feb. 20, 2015 for U.S. Appl. No. 13/688,962.
Office action dated Mar. 9, 2012 for U.S. Appl. No. 12/509,318.
Office action dated Mar. 12, 2013 for U.S. Appl. No. 13/603,035.
Office action dated Mar. 13, 2012 for U.S. Appl. No. 12/965,719.
Office action dated Mar. 20, 2015 for U.S. Appl. No. 13/670,151.
Office action dated Apr. 3, 2009 for U.S. Appl. No. 09/825,533.
Office action dated Apr. 11, 2007 for U.S. Appl. No. 10/693,232.
Office action dated Apr. 19, 2006 for U.S. Appl. No. 11/002,046.
Office action dated Apr. 21, 2016 for U.S. Appl. No. 13/670,151.
Office action dated Apr. 29, 2010 for U.S. Appl. No. 09/825,533.
Office action dated May 02, 2000 for U.S. Appl. No. 09/447,986.
Office action dated May 8, 2014 for U.S. Appl. No. 12/965,719.
Office action dated May 18, 1999 for U.S. Appl. No. 09/001,032.
Office action dated May 20, 2008 for U.S. Appl. No. 09/825,533.
Office action dated May 20, 2016 for U.S. Appl. No. 13/801,853.
Office action dated May 26, 2015 for U.S. Appl. No. 13/801,853.
Office action dated Jun. 7, 2011 for U.S. Appl. No. 12/177,540.
Office action dated Jun. 8, 2000 for U.S. Appl. No. 09/447,986.
Office action dated Jun. 16, 2008 for U.S. Appl. No. 09/840,730.
Office action dated Jun. 18, 2007 for U.S. Appl. No. 11/002,046.
Office action dated Jun. 26, 2014 for U.S. Appl. No. 13/801,853.
Office action dated Jul. 2, 2014 for U.S. Appl. No. 13/670,151.
Office action dated Jul. 10, 1997 for U.S. Appl. No. 08/394,157.
Office action dated Jul. 12, 2005 for U.S. Appl. No. 11/002,046.
Office action dated Jul. 15, 2002 for U.S. Appl. No. 09/940,129.
Office action dated Jul. 17, 2007 for U.S. Appl. No. 09/840,730.
Office action dated Jul. 19, 2006 for U.S. Appl. No. 10/693,232.
Office action dated Aug. 31, 2016 for U.S. Appl. No. 13/670,151.
Office action dated Sep. 3, 2015 for U.S. Appl. No. 13/688,962.
Office action dated Sep. 8, 2006 for U.S. Appl. No. 09/825,533.
Office action dated Sep. 18, 2013 for U.S. Appl. No. 13/801,853.
Office action dated Sep. 29, 1998 for U.S. Appl. No. 09/001,032.
Office action dated Oct. 4, 2005 for U.S. Appl. No. 09/840,730.
Office action dated Oct. 4, 2011 for U.S. Appl. No. 12/965,719.
Office action dated Oct. 9, 2015 for U.S. Appl. No. 13/801,853.
Office action dated Oct. 11, 2012 for U.S. Appl. No. 12/965,719.
Office action dated Oct. 22, 2014 for U.S. Appl. No. 13/801,853.
Office action dated Nov. 14, 2007 for U.S. Appl. No. 11/324,504.
Office action dated Nov. 17, 2014 for U.S. Appl. No. 13/953,503.
Office action dated Nov. 22, 2013 for U.S. Appl. No. 13/801,853.
Office action dated Nov. 25, 2011 for U.S. Appl. No. 12/509,318.
Office action dated Nov. 26, 2010 for U.S. Appl. No. 09/825,533.
Office action dated Dec. 5, 2006 for U.S. Appl. No. 11/002,046.
Office action dated Dec. 19, 2002 for U.S. Appl. No. 09/940,129.
Office action dated Dec. 20, 2007 for U.S. Appl. No. 09/840,730.
Office action dated Dec. 30, 2010 for U.S. Appl. No. 12/177,540.
Palmblad, et al. Electronic diaries and questionnaires: designing user interfaces that are easy for all patients to use. Qual Life Res. Sep. 2004;13(7):1199-207.
Patrick et al. Content Validity—Establishing and Reporting the Evidence in Newly Developed Patient-Reported Outcomes (PRO) Instruments for Medical Product Evaluation: ISPOR PRO Good Research Practices Task Force Report: Part 1—Eliciting Concepts for a New PRO Instrument. Value in Health 14:967-977 (2011).
Patrick, et al. Content Validity—Establishing and Reporting the Evidence in Newly Developed Patient-Reported Outcomes (PRO) Instruments for Medical Product Evaluation: ISPOR PRO Good

(56) References Cited

OTHER PUBLICATIONS

Research Practices Task Force Report: Part 2—Assessing Respondent Understanding. Value in Health 2011;14:978-988.
Paty, et al. The VVSymQ instrument: Use of a new patient-reported outcome measure for assessment of varicose vein symptoms. Phlebology Aug. 2016;31(7):481-8 (Epub Jul. 15, 2015).
Raymond, et al. Adding Value. European Pharmaceutical Contractor, Feb. 2016, pp. 14-15. © Samedan Ltd.
Raymond, et al. Optimizing Electronic Clinical Outcome Assessment Materials Required for IRB/IEC Review. Medical Research Law & Policy, Mar. 2016 (5 pgs.).
Reaney et al. A Systematic Method for Selecting Patient-Reported Outcome Measures in Diabetes Research. Diabetes Spectrum 2014;27(4):229-232.
Reaney, et al. Measuring and Interpreting Patient-Reported Outcome Data from Clinical Trials of Diabetes Medication. Journal of Diabetes Research & Clinical Metabolism 2014;3:7.
Reaney, et al. One Program, Four Stakeholders: An Overview of the Utilization of Patient-Reported Outcomes in Intervention Development to Meet the Needs of Regulators, Payers, Healthcare Professionals and Patients. Pharmaceutical Medicine 2015;29:69-78.
Reaney, et al. Therapeutic Success or Failure: A Journey, Not Just a Destination. Applied Clinical Trials, Feb. 2016;25(2):2 pgs.
Reaney. Patient's Voice Finally Being Heard in Diabetes Drug Research. Applied Clinical Trials, Aug. 2015 (3 pgs).
Reaney. The Importance of Understanding the Impact of Preference in Clinical Trials of Diabetes Interventions. Journal of Diabetes, Aug. 2014 (2 pgs.).
Regan. Centralized Data Surveillance: Enabling Real-Time Risk Based Monitoring in Clinical Trials. White Paper. Jan. 2016 (4 pgs).
Regan. Optimizing Trial Oversight through Centralized Data Surveillance. DIA Global Forum 2016;8(2):36-38.
Reinstaedtler, et al. Inter-visit Variability of Spirometry and Diffusion in a Worldwide Multicenter Clinical Trial with Moderate to Severe COPD patients. ATS Conference Presented Poster, Apr. 2011 (1 pg).
Reinstaedtler, et al. Intra-visit Repeatability of Slow Spirometry in a Worldwide Multicenter Clinical Trial with Moderate to Severe COPD patients. ATS Conference Presented Poster, Apr. 2011 (1 pg.).
Rocchio. BYOD for Clinical Trials: Fact v. Fiction. CenterWatch Monthly, May 2015 (2 pgs).
Rocchio. eDiary System's Importance in a Clinical Trial for Female Sexual Dysfunction. Applied Clinical Trials, Mar. 2015 (4 pgs).
Rodriguez et al. Electrocardiographic assessment for therapeutic proteins. American Heart Journal 2010; 160(4):627-34.
Rogers, et al. Electronic Diary (eDiary) Improves the Quality of Data Collection over Conventional Paper Diary in Patients with Symptomatic COPD. American Thoracic Society Presented Poster, May 2006 (1 pg.).
Rothman, et al. Use of Existing Patient-Reported Outcomes (PRO) Instruments and Their Modification. Value in Health 2009;12(8):1075-1083.
Schatz, et al. Development and Preliminary Validation of the Adult Asthma Adherence Questionnaire™. J Allergy Clin Immunol: in Practice 1(3):280-288 (2013).
Shah, et al. ICH E14 Q&A(R2) document: commentary on the further updated recommendations on thorough QT studies. BR J Clin Pharmacol. Mar. 2015;79(3):456-464.
Sirichana, et al. Choices of Spirometry Measures for Remote Patient Monitoring in COPD. ATS Presented Poster, May 2014 (1 pg.).
Sirichana, et al. Daily Physical Activity in COPD: Quantification by Tri-axial Accelerometry. ATS Conference Presented Poster, May 2013.
Sirichana, et al. Feasibility of Remote Monitoring of Physiology and Symptoms in COPD Patients. ATS Conference Presented Poster, May 2013 (1 pg.).
Sirichana, et al. Limits of the Correlation of Wrist-worn Accelerometry with Oxygen Uptake. ATS Presented Poster, May 2014 (1 pg.).
Sirichana, et al. The Predictors for COPD Exacerbations using Remote Patient Monitoring. Poster presented at European Respiratory Society, Sep. 2015 (1 pg).
Stergiopoulos, et al. Mapping Adoption of Centralized Cardiac Safety Assessment. Tufts University, Mar. 2010 (12 pgs).
Stone, et al. Patient Compliance with Paper and Electronic Diaries. Controlled Clinical Trials 2003;24:182-199.
Strober, et al. Item-Level Psychometric Properties for a New Patient-Reported Psoriasis Symptom Diary. Value in Health 2013;16(6):1014-1022.
Tiplady. Electronic Clinical Outcome Assessments (eCOAs): Value of Site-Based Assessments. White Paper. Jan. 2014 (14 pgs).
Turner. Using ePRO for the First Time: Lessons Learned. White Paper. Mar. 2016 (9 pgs.).
Turner-Bowker, et al. Cognitive Testing of the Investigator's Global Assessment of Lateral Canthal Lines (LCL) Severity Scale. ISPOR Conference Presented Poster, May 2013 ( 1pg).
Van Nooten, et al. Development and Content Validity of an Endometriosis Patient Diary. ISPOR Conference Presented Poster, May 2013 (1 pg.).
Vantubergen, et al. Are patient-reported outcome instruments for ankylosing spondylitis fit for purpose for the axial spondyloarthritis patient? A qualitative and psychometric analysis. Journal of Rheumatology 2015;54(10):1842-1852 (Epub May 2015).
Walton, et al. Clinical Outcome Assessments: Conceptual Foundation—Report of the ISPOR Clinical Outcomes Assessment—Emerging Good Practices for Outcomes Research Task Force. Value in Health 2015;18:741-752.
Wild et al. Multinational Trials—Recommendations on the Translations Required, Approaches to Using the Same Language in Different Countries, and the Approaches to Support Pooling the Data. Value in Health 12(4):430-440 (2009).
Williams, et al. Pain Assessment in Patients With Fibromyalgia Syndrome. Clin J Pain 2004;20(5):348-356.
Zbrozek, et al. Validation of Electronic Systems to Collect PRO Data—Report of the ISPOR ePRO Systems Validation Good Research Practices Task Force. Value in Health 2013;16:480-489.
Office Action dated May 22, 2017 for U.S. Appl. No. 13/670,151.
eResearchTechnology GmbH. MasterScope©: Diagnostic Platform for Centralized Spirometry, ECG and Home Monitoring. ©2014 eResearchTechnology GmbH. Rev. 02, May 30, 2014. 4 pages.
eResearchTechnology GmbH. SpiroPro© CT: Handheld Spirometer and Pulse Oximeter. ©2014 eResearchTechnology GmbH. Rev. 01, Jul. 2014. 2 pages.
ERT©. ERT Introduces Updated Diagnostic Platform for Centralized Spirometry, ECG, and Home Monitoring in Respiratory Clinical Trials. Web article. Jun. 16, 2014. 4 pages. URL:< https://www.ert.com/ert-introduces-updated-diagnostic-platform-for-centralized-spirometry-ecg-and-home-monitoring-in-respiratory-clinical-trials/>.
Office Action dated Jan. 5, 2016 for U.S. Appl. No. 12/434,244.
Office Action dated Jan. 22, 2015 for U.S. Appl. No. 13/838,698.
Office Action dated Jan. 26, 2017 for U.S. Appl. No. 12/434,244.
Office Action dated Jan. 31, 2011 for U.S. Appl. No. 12/434,244.
Office Action dated Feb. 8, 2016 for U.S. Appl. No. 13/838,698.
Office Action dated Mar. 24, 2014 for U.S. Appl. No. 12/434,244.
Office Action dated Jun. 8, 2017 for U.S. Appl. No. 13/688,962.
Office Action dated Jun. 15, 2011 for U.S. Appl. No. 12/434,244.
Office Action dated Jun. 24, 2015 for U.S. Appl. No. 13/838,698.
Office action dated Jun. 28, 2017 for U.S. Appl. No. 13/801,853.
Office Action dated Jul. 21, 2015 for U.S. Appl. No. 12/434,244.
Office Action dated Jul. 28, 2016 for U.S. Appl. No. 12/434,244.
Office Action dated Dec. 1, 2014 for U.S. Appl. No. 12/434,244.
Co-pending U.S. Appl. No. 15/291,103, filed Oct. 12, 2016.
Co-pending U.S. Appl. No. 15/468,613, filed Mar. 24, 2017.
Office Action dated Apr. 4, 2017 for U.S. Appl. No. 14/792,126.
Office Action dated May 5, 2017 for U.S. Appl. No. 14/579,670.
Office Action dated Sep. 5, 2017 for U.S. Appl. No. 14/579,574.
Office Action dated Nov. 29, 2017 for U.S. Appl. No. 14/579,670.

* cited by examiner

VAS Line with Blow Up of Pixel Detail at End Points

SYSTEM, METHOD AND APPARATUS FOR DISPLAYING A NON-BIASING AND SELF-ADJUSTING VISUAL ANALOG SCALE ON A COMPUTING DEVICE

TECHNICAL FIELD

The disclosed subject matter relates to systems, methods and apparatus for displaying a non-biasing and self-adjusting visual analog scale on a computing device.

BACKGROUND

A visual analog scale (VAS) is a psychometric instrument which can be used to measure any scalar quantity over a range, but it is particularly useful for self-rating of feelings, attitudes and intensity of subjective experiences. Changes in these subjective states are difficult to measure by an objective means. Psychologists call the underlying subjective experiences such as pain, anger, sadness, "latent variables," and rely on self-assessments to quantify degree, recognizing that the self-assessment is a report about a variable that is not otherwise directly corroborated. For example, the VAS is commonly used in patient health assessments to measure pain intensity or pain relief felt by a patient after a medical procedure, or due to an illness, as part of a treatment or clinical trial. A VAS comprises a vertical or horizontal line, where the endpoints of the line define the extreme values of a psychological range for the scale. For example, if the VAS is being used to measure pain intensity, then one endpoint of the VAS might represent no pain (e.g., scored as 0) and the other endpoint might represent extreme pain (e.g., scored as 10 or 100).

Traditionally, a VAS has appeared, as a vertical or horizontal line on a paper form, as shown in FIG. 1. The VAS 100 includes left and right anchor lines at the scale extremes, 120 and 130 respectively, at either end of the line, with text ("anchor text") describing the level of feeling, sensation or subjective state corresponding to each extreme. The VAS 100 is divided into intervals of distance. Each interval represents a unit value in proportion to the distance between the two extreme values at the anchors (e.g., between 0 and 10 or 0 and 100). It is important that the length of each interval of distance along the VAS be identical in length to ensure that each unit value has an equal probability of being selected by a subject. Typically, a "stem" (i.e., a question or request intended to elicit a response from a human subject) on a VAS appears above or below the VAS. Subjects indicate a response to the stem by placing a pen or pencil mark that crosses the line somewhere along the VAS. Their response quantifies their subjective felt state in relation to the two extreme psychological states that are described at the ends of the VAS line. For example, a stem question may ask how much pain a subject has felt in the past 24 hours. If the subject felt mild pain, he can put a mark close to the "no pain" endpoint to represent his assessment of the experienced pain.

In designing a VAS, there are certain variables (e.g., VAS length, total number of units, and labeling language) that need to be defined in order to relate the VAS response to a score. Consistency in these variables allows VAS results to be compared across subjects in a single or multiple studies, or across the same subject over a period of time. The paper version VAS is typically 10 centimeters (cm) long and represents a score ranging from 0 to 100 (or 0.0 to 10.0), with 100 intervals of distance. Because survey instruments eliciting VAS responses are administered to subjects on fairly standard paper size, replicating a 10 cm long VAS including 101 values corresponding to 100 identical intervals of distance is practical. A subject's response on the VAS can be scored numerically by applying a commonly available metric ruler to measure the distance from one end of the scale to the subject's response mark. Because the intervals of distance on the VAS are the same size and each interval of distance corresponds to a single score, each score is equally likely to be chosen. In contrast, if each interval of distance corresponding to a score was not equally sized, then scoring bias would result because some scores would correspond to a greater interval of distance. Thus, equally sized intervals along the VAS line support consistent and unbiased scoring results.

However, the implementation of VAS assessments is shifting away from paper form to electronic devices such as hand-held computing devices or tablets. While displaying a VAS on a hand-held or other computing device supports automatic scoring and may be easier for subjects and scientists to use, these new methods of implementing and administering VAS scales also introduce challenges. In contrast to the standard sized paper, computing devices come in different sizes, some with display areas smaller than 10 cm. So a standard 10 cm long VAS simply will not fit on such a small display. Further, the diversity of device display sizes (from 2-20 cm or even more) can support VAS lines of varying length suited to each display. However, in displaying a VAS on a computing device, one objective remains the same as with its paper counterpart: to avoid bias in the scoring of subject responses.

One approach to dealing with this problem is to display a VAS that has a fixed, pre-programmed, length regardless of the aspect ratios, resolutions and sizes of different screens. In order to divide this fixed length into 100 intervals, a computing device might adjust the number of pixels assigned to each of the 100 intervals along the VAS line so that the intervals are unequal to each other. However, the result would then be that some intervals on the VAS line would be longer than others and thus more likely to be selected, introducing a bias in favor of the intervals with more pixels. Thus, there is a general need for an improved method for displaying a VAS on a computing device. Embodiments of the disclosed subject matter are directed to a VAS displayed on a computing device that automatically adjusts to different screen aspect ratios/resolutions so as to avoid bias in the scoring of a response line.

SUMMARY

In some embodiments, the disclosed subject matter includes a system for displaying a non-biasing, self-adjusting visual analog scale. The disclosed system further includes a screen display, a screen dimension detection module and a visual analog scale display module. The screen dimension detection module is configured to determine a number of pixels available on the screen display to display the visual analog scale. The visual analog scale display module is configured to receive the available number of pixels from the screen dimension detection module, generate the visual analog scale comprising equal intervals of distance to fit the number of pixels available on the screen display, and display the visual analog scale on the screen display.

In some embodiments, the disclosed subject matter includes a method for displaying a non-biasing, self-adjusting visual analog scale. The disclosed method further includes determining, using a screen dimension detection module, a number of pixels available on a screen display to display a visual analog scale. The disclosed method further includes receiving, at a visual analog scale display module, the available number of pixels from the screen dimension detection module. The disclosed method further includes generating, using the visual analog display module, the visual analog scale comprising equal intervals of distance to fit the number of pixels available on the screen display. The disclosed method further includes displaying, using the visual analog display module, the visual analog scale on the screen display.

In one aspect, the disclosed system further includes a unit cursor display module configured to generate a unit cursor for indicating a position on the generated visual analog scale.

In one aspect, the disclosed system further includes a visual analog scale response module configured to determine in pixels a position of the unit cursor in relation to a starting unit of the visual analog scale and to generate a unit number that corresponds to said position.

In one aspect, the visual analog scale display module of the disclosed system is further configured to generate the visual analog scale to measure a range across a continuum between two extremes, wherein each of the two extremes is represented as an endpoint on the visual analog scale.

In one aspect, the disclosed system further includes a visual analog scale anchor display module configured to generate an anchor line indicating a value at each of the endpoints of the visual analog scale.

In one aspect, the visual analog scale display module of the disclosed system is further configured to generate a visual analog scale that is divided into 100 equal intervals of distance.

In one aspect, the visual analog scale display module of the disclosed system is further configured to display the visual analog scale on the screen display in a vertical or a horizontal orientation.

In one aspect, the visual analog scale anchor display module of the disclosed system is further configured to generate a first text label for a first anchor line of the visual analog scale and display the first text label on two or more lines of the screen display when the length of the first text label exceeds a first predetermined threshold. The visual analog scale anchor display module of the disclosed system is further configured to generate a second text label for a second anchor line of the visual analog scale and display the second text label on two or more lines of the screen display when the length of the second text label exceeds a second predetermined threshold.

In one aspect, the first and second predetermined thresholds of the disclosed system are the same.

These and other capabilities of the disclosed subject matter will be more fully understood after a review of the following figures and detailed description.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems, methods and apparatus of the disclosed subject matter and the environment in which such systems and methods may operate, in order to provide a thorough understanding of the disclosed subject matter. It will be apparent to one skilled in the art that certain features, which are well known in the art, are not described in detail in order to avoid complication of the disclosed subject matter. In addition, it will be understood that the examples provided below are some embodiments, and that it is contemplated that there are other systems and methods that are within the scope of the disclosed subject matter. Further, in the disclosed subject matter, a horizontal VAS is described. However, it will be apparent to one skilled in the art that the disclosed subject matter may be also be implemented to generate a non-biasing and self-adjusting vertical VAS. Moreover, a pixel, as discussed herein, can refer to a single horizontal pixel, or a single horizontal column of pixels.

Figure 1:
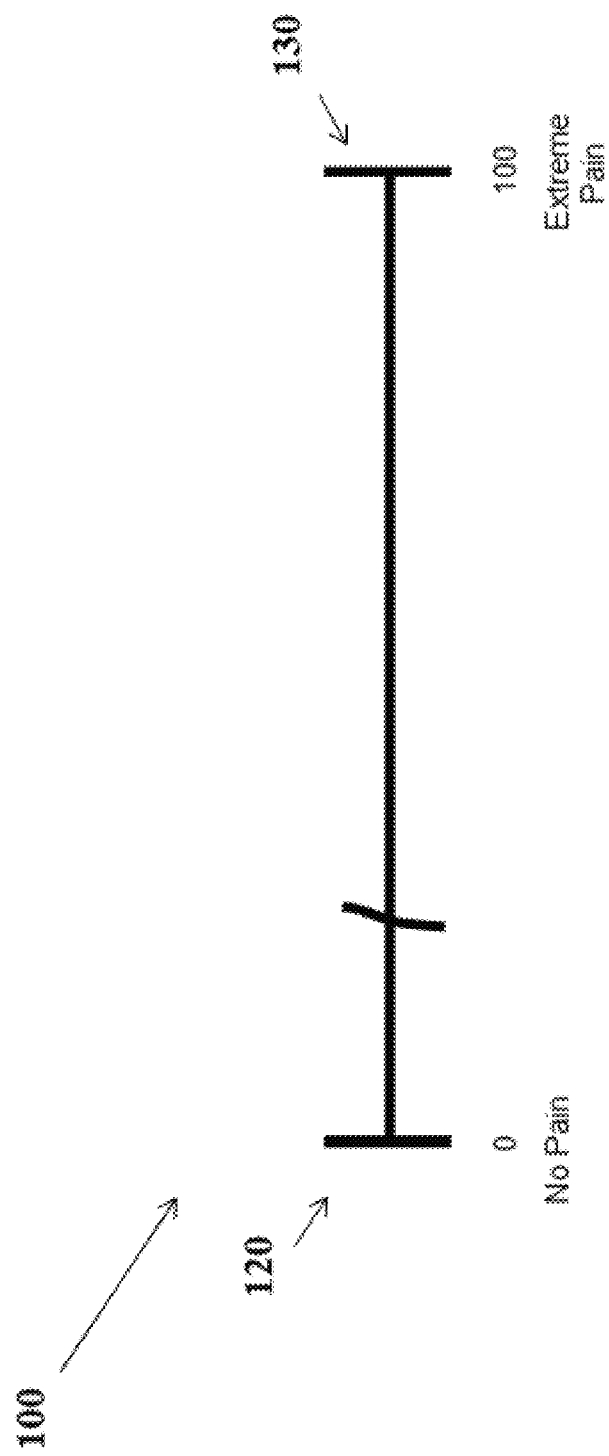
FIG. 1 illustrates a paper version of a VAS.
Figure 2:
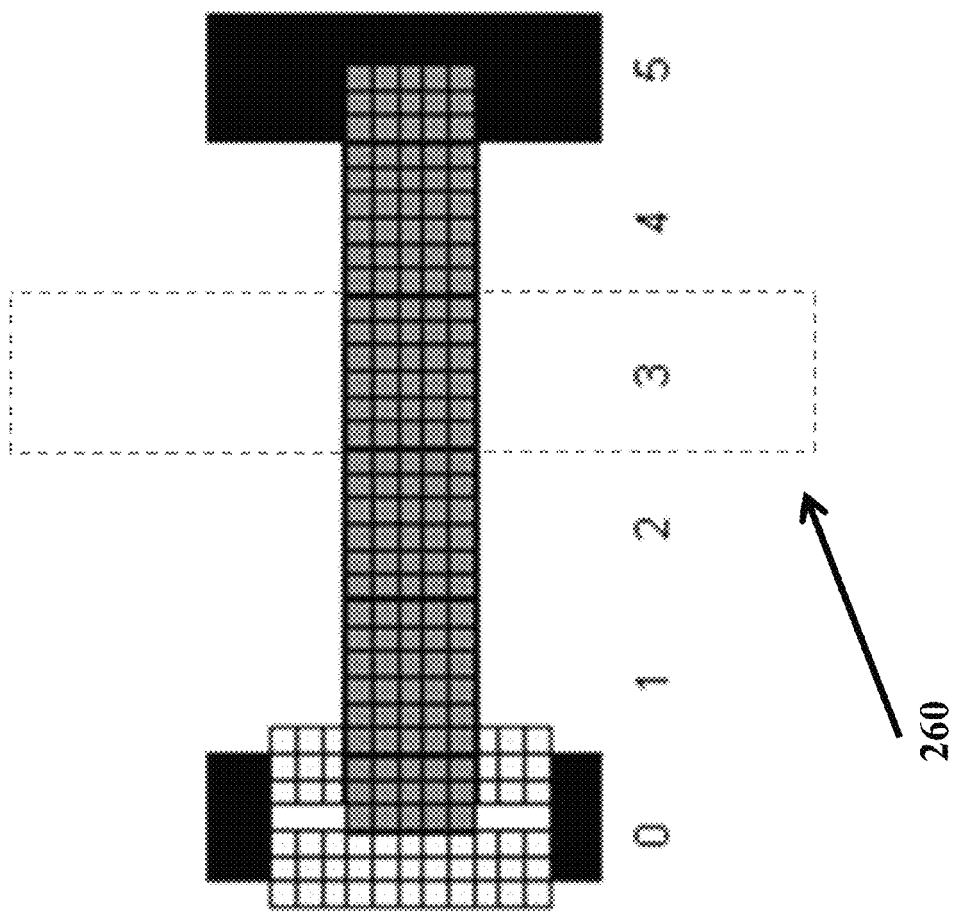
FIG. 2 illustrates target areas included in a VAS in accordance with some embodiments of the disclosed subject matter.

A computing device can display a VAS that automatically adjusts to different screen aspect ratios/resolutions, while preserving the reliability of the VAS. For example, a computing device can calculate a number of pixels available on a screen display to display a VAS. Then the computing device can generate a VAS comprising equal intervals of distance to fit the available screen display. In some embodiments, the computing device can also generate target areas, where each target area corresponds to a score on the VAS (e.g., 0 to 100) and are equally sized (i.e., X pixels wide and Y pixels high) to prevent selection bias. Tapping, touching, moving a unit cursor into the target area, or otherwise selecting the target area results in selecting the single number that corresponds to the target area. The target areas are transparent to the user. FIG. 2 illustrates an example target area along a VAS corresponding to the score "3." The dotted lines do not appear on the display, but are intended to demarcate the boundary of the target area that corresponds to the score 3.

The VAS can include an anchor line at each end of the VAS line that indicates an upper and lower value of a range of values measured by the VAS. The VAS can also include a unit cursor that allows a subject to indicate by pixel, interval, or target area, a position along the VAS line. In some embodiments, depending on the settings for the VAS display, when the subject selects a position along the VAS line, the unit cursor will be displayed as centered on the selected pixel, interval or target area.

Figure 3:
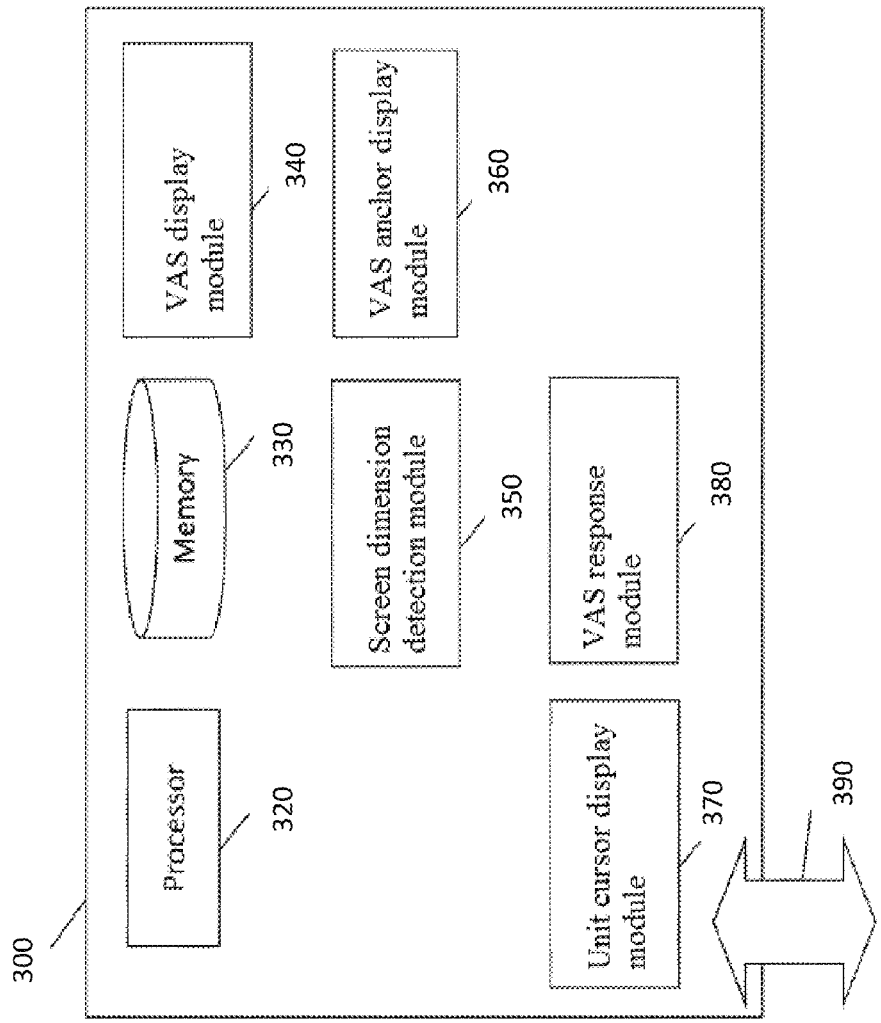
FIG. 3 illustrates a computing device for displaying a non-biasing and self-adjusting VAS in accordance with some embodiments of the disclosed subject matter.

FIG. 3 illustrates a computing device that includes a VAS display module in accordance with some embodiments. The computing device 300 can include a processor 320, memory 330, a VAS display module 340, a screen dimension detection module 350, a VAS anchor display module 360, a unit cursor display module 370, a VAS response module 380, and an interface 390. Modules 340, 350, 360, 370 and 380 can be implemented as separate modules or sub-modules with different functionality. The functionality described herein can be combined into a single component or spread across several components.

In some embodiments, the processor 320 can execute instructions and one or more memory devices 330 can be coupled to the processor for storing instructions and/or data. The memory 330 can be a non-transitory computer readable medium, flash memory, a magnetic disk drive, an optical drive, a programmable read-only memory (PROM), a read-only memory (ROM), or any other memory or combination of memories. Memory devices 330, such as a cache or a static random access memory (SRAM), can be used to temporarily store data. Memory devices 330 can also be used for long-term data storage. The processor 320 and the memory devices 330 can be supplemented by and/or incorporated into special purpose logic circuitry.

In some embodiments, one or more of the modules 340, 350, 360, 370 and 380 can be implemented in software using the memory 330. The software can run on a processor 320 capable of executing computer instructions or computer code. For example, processor 320 can be a general-purpose device, such as a microcontroller and/or a microprocessor, such as the Pentium IV series of microprocessors manufactured by the Intel Corporation of Santa Clara, Calif., specifically programmed to provide the functionality described herein. Generally, the processor 320 receives instructions and data from a read-only memory or a random access memory or both.

In some embodiments, the interface 390 can be implemented in hardware to send and receive signals over a variety of mediums, such as optical, copper, and wireless, and in a number of different protocols some of which may be non-transient.

In some embodiments, disclosed method steps can be performed by one or more processors 320 executing a computer program to perform functions of the disclosed subject matter by operating on input data and/or generating output data.

In some embodiments, the implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

In some embodiments, the computing device 300 can be a smart phone, a tablet computer, a laptop, a personal digital assistant (PDA), a PHT ePro device or other device running the PHT LogPad® APP, SitePad®, NetPRO™ and/or LogPad® N5 technology. The computing device 200 operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard.

In some embodiments, the computing device 300 can include a server. The server can operate using operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

Calculating the Length of a VAS

Figure 4:
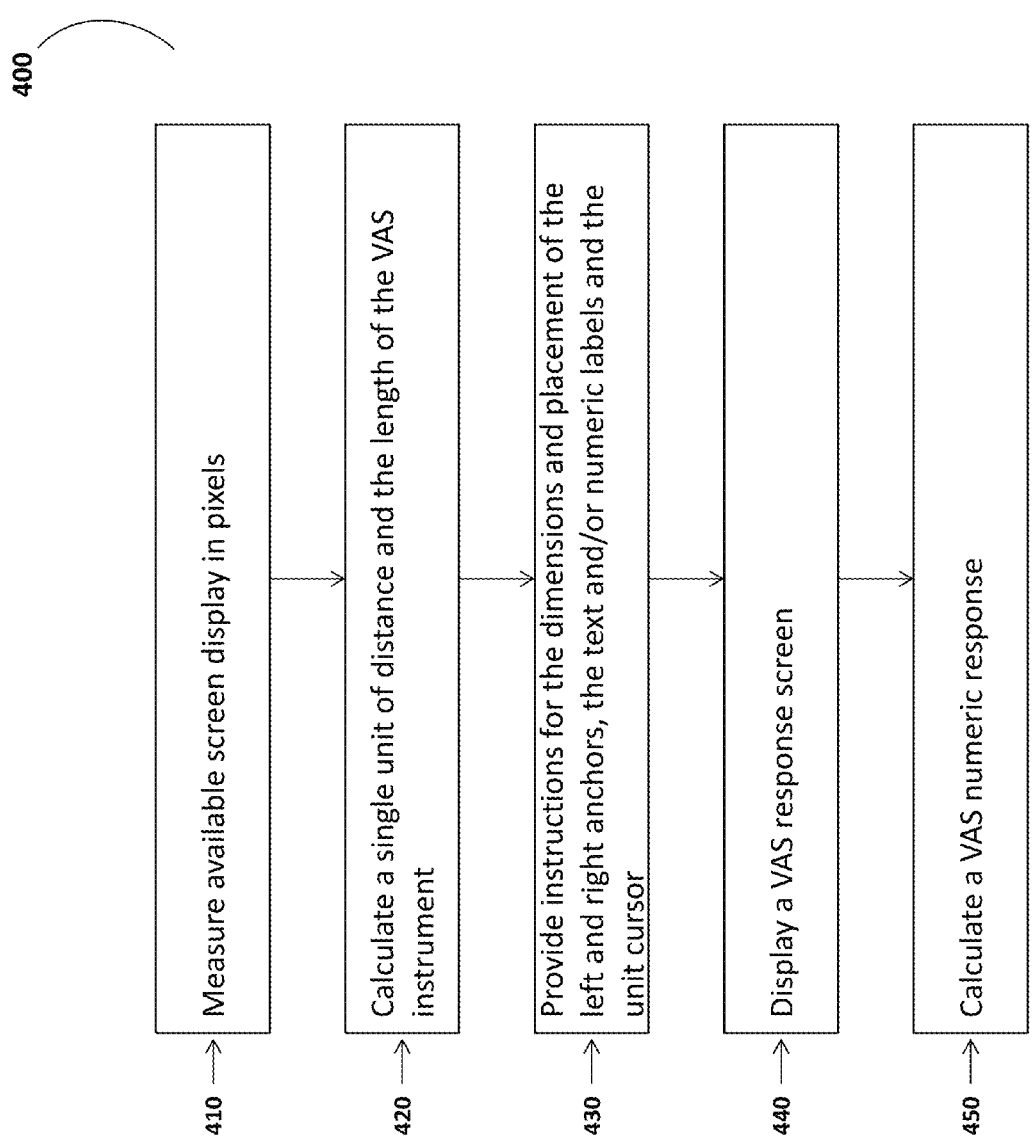
FIG. 4 illustrates a process flow diagram of an exemplary method for use with the computing device of FIG. 3 of the disclosed subject matter.

In operation, referring to FIG. 4, with further reference to FIG. 3, a process 400 in accordance with the disclosed subject matter is shown for displaying a non-biasing and self-adjusting VAS on a computing device. Process 400 can use the computing system 300 (although this is not required) and includes the steps set forth below.

At step 410, the screen dimension detection module 350 measures in pixels the available screen display for displaying a VAS on a VAS response screen. In some embodiments, the screen dimension detection module 350 is configured to detect the maximum available area for displaying a VAS on a screen where a user can provide a response to a stem using the VAS ("VAS response screen") within the limitations of the computing device (e.g., size of the display screen) and/or any application running on the computing device (e.g., size of the application browser window). For precision, the available display area can be measured in pixels. In some embodiments, the screen dimension detection module 350 is configured to subtract a predetermined number of pixels (e.g., 6 pixels) from the available display area to ensure that the VAS endpoint anchors and a unit cursor fit onto the available display area. In some embodiments, a pixel buffer ("edge boundary") is inserted between the edge of the screen and the VAS display. This edge boundary is subtracted from the available display area. In some cases, the number of pixels that are subtracted can be the same regardless of the available display area. In other cases, the number of pixels that are subtracted can vary based on the dimensions of the display area. After the screen dimension detection module 350 obtains the available display area, it transmits the value to the VAS display module to calculate the length of a single interval of distance on the VAS to be displayed.

At step 420, the VAS display module 340 calculates the length of a single interval of distance for a VAS that will correspond to each numerical score, as well as the length of the entire VAS. In some embodiments, the VAS display module 340 can be configured to calculate the length of an interval of distance, in pixels, using the following mathematical formula:

> length of an interval of distance=math·floor((display area width−number of pixels reserved for anchor lines, unit cursor and edge boundary)/ 100).

The math·floor is a mathematical function that rounds down a non-integer result to the previous integer. For example, math·floor (1.5) is rounded down to 1. In one embodiment, the formula above is applied to a display area that has a width of 650 pixels and 40 pixels reserved for edge boundary, anchors lines and unit cursor, resulting in an interval length of 6 pixels (i.e., length of an interval of distance=math·floor ((650−40)/100=6.1)=6).

Once a single interval of distance of the VAS is calculated, the VAS display module 340 can be configured to calculate the length of a VAS that has 100 intervals of distance, using the following mathematical formula:

> VAS length=(length of an interval of distance*100) plus the number of pixels reserved for the anchor lines.

While the length of the VAS will vary based on the available display area of a computing device, the total number of units (e.g., 101) and intervals of distance (e.g., 100 uniformly sized intervals) remain the same. This ensures that a mark on the VAS scale will correctly correlate to a score, and produce consistent and reliable VAS results, regardless of the size of the device used.

A VAS that is 100 intervals of distance long will have 101 unit numbers. The disparity between the number of line units—101—and the number of intervals of distance—100—can be understood by looking at a simple example of a VAS, as shown in FIG. 3, that includes six line units (i.e., scores of 0, 1, 2, 3, 4, and 5) and five intervals of distance.

The endpoints of the VAS 500 are 0 and 5. In the example shown in FIG. 5, each interval of distance is defined by six pixels. Each of the units 1 through 4 defines a line or interval of distance six pixels long—three pixels are lower than the unit number and three pixels are greater than the unit number.

Since the length of the VAS in some embodiments measures distance in whole units, each of the three pixels below unit 1 rounds up to 1 and each of the three pixels greater than unit 1 rounds down to 1. Therefore, anytime a subject places the unit cursor on any of the pixels defined by the six-pixel line between 0.5 and 1.5, the unit value is 1.

If a subject marks or places the unit cursor on any of the three pixels to the right of 0 endpoint unit, the resulting score will be 0. In order for the target area that corresponds to the score 0 to be equivalent to the target areas that correspond to the scores 1 through 4 respectively, the three pixels to the left of the 0 endpoint unit (as shown in the shaded area 510) must also lie within the target area corresponding to 0. In some embodiments, this area can also display an endpoint anchor line for the VAS. The user can select the endpoint anchor, if he wants to select the unit 0 on the VAS.

Likewise, at the other endpoint unit 5, even though the pixels with exact distance values greater than 5 are rounded down to 5, the line has been defined as the distance from exactly 0 to exactly 5. The three pixels to the right of the 5 endpoint unit (as shown in the shaded area 520) must also lie within the target area corresponding to 5. In some embodiments, this area can also display an endpoint anchor line for the VAS. The user can select the endpoint anchor, if he wants to select the unit 5 on the VAS.

Figure 5:
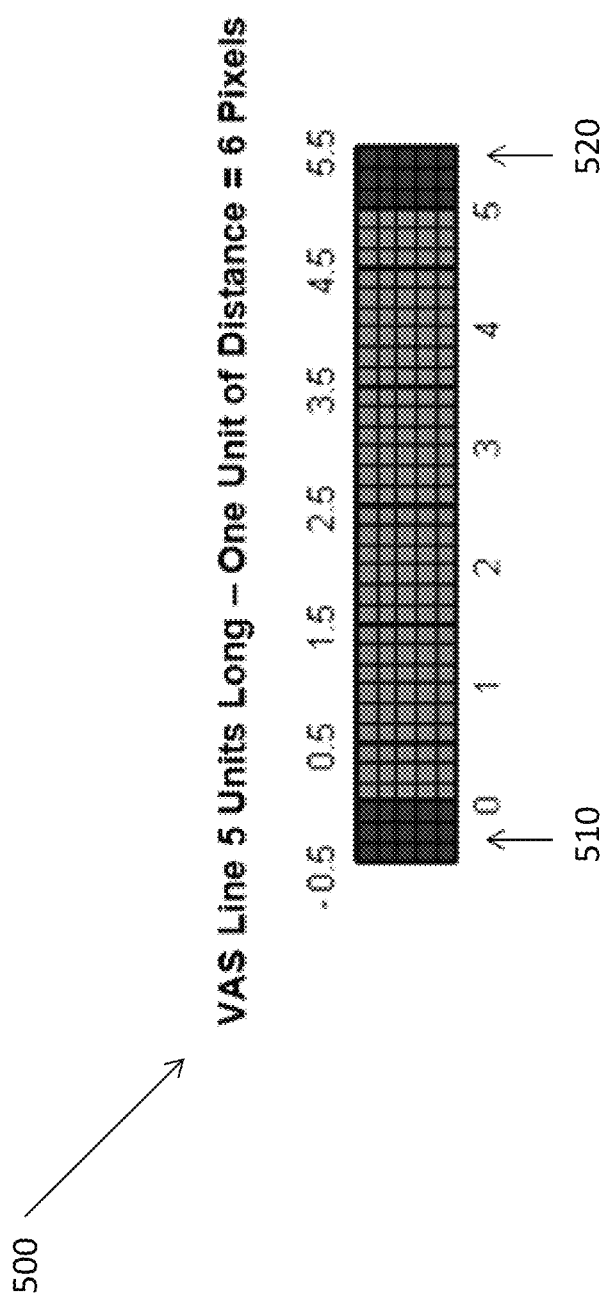
FIG. 5 illustrates the intervals of distance included in a VAS in accordance with some embodiments of the disclosed subject matter.

The VAS in FIG. 5 illustrates that, in some embodiments, a line of X intervals of distance will appear to be X+1 units, because the extra pixels at either VAS endpoint, although part of the intervals of distance demarcated by the endpoint units, may be used to define the anchor lines with a width (i.e., thickness) greater than one pixel. In some embodiments, the user can select the scores corresponding to the endpoints by touching or placing a screen cursor within a target area that extends to the left or right of the endpoint units of the VAS line.

While a VAS having 100 intervals of distance is the standard length generally accepted by the scientific community, in other embodiments, the VAS display module can be configured to display a VAS having greater or fewer intervals of distance than 100, by applying the following mathematical formulas:

> length interval of distance=math·floor((display area width−number of pixels reserved for anchor lines, unit cursor and edge boundary)/# of intervals of distance to be included in the VAS); and > VAS length=(length of interval of distance*# of intervals of distance to be included in the VAS) plus number of pixels reserved for the anchor lines.

These mathematical formulas applied by the VAS display module 340 ensure that all the intervals of distance in a VAS will be uniformly sized.

VAS Line Thickness

In some embodiments, the thickness of the VAS line (i.e., the height for a horizontal VAS line or the width for a vertical VAS line) will depend on the number of pixels that represent a single interval of distance on the VAS. In some embodiments, the thickness of the VAS line will be:

Five pixels for a VAS using more than five pixels to represent a single interval of distance on the VAS.

Three pixels for a VAS using five pixels or less to represent a single interval of distance on the VAS.

Dimensions of the VAS Left and Right Anchors

At step 430, the VAS anchor display module 360 provides instructions for the dimensions and placement of the left and right anchors and the text and/or numeric labels appear on the VAS. In some embodiments, computing device 300 will include a VAS anchor display module 360 configured to display left and right endpoint anchors having a fixed height (e.g., 37 pixels) regardless of the display area and to center them vertically on the VAS line. In some embodiments, the left and right anchors are 37 pixels high, extending two pixels above and below a 33 pixel high unit cursor. In the case of VAS lines five pixels high, the 37 pixel high anchors will extend 16 pixels above the line and 16 pixels below the line. In the case of VAS lines three pixels high, the 37 pixel high anchors will extend 17 pixels above the line and 17 pixels below the line. Likewise, in embodiments, where the VAS line is displayed vertically, the VAS anchor display module 360 will display an endpoint anchor at the top and the bottom ends of the VAS line and center them horizontally on the VAS line.

In some embodiments, the VAS anchor display module 360 can be configured to vary the width of the left and right anchors depending the height of the VAS line. For example:

Anchor lines will be five pixels wide when VAS lines are five pixels high.

Anchor lines will be three pixels wide when VAS lines are three pixels high.

Figure 6:
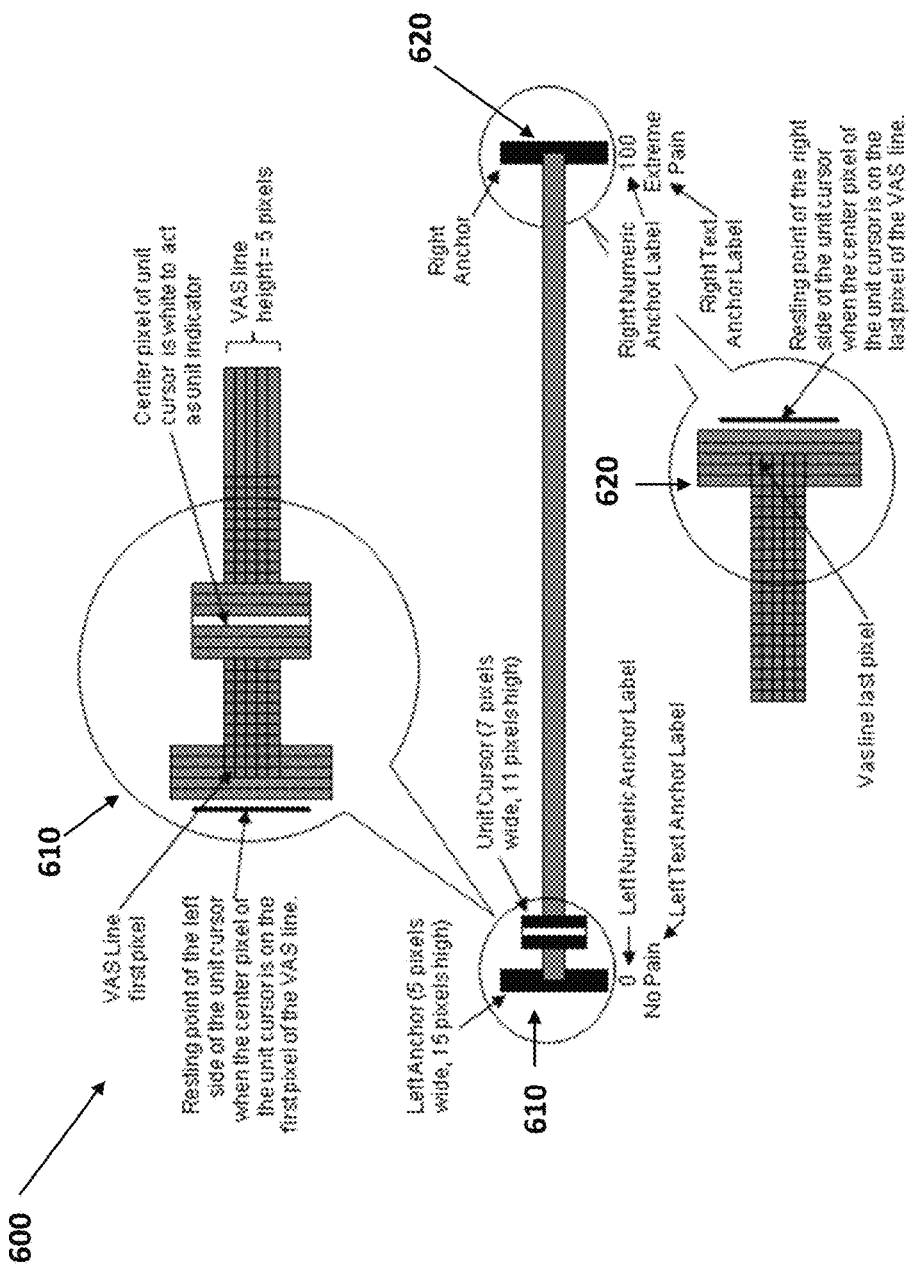
FIG. 6 illustrates alignment of the unit cursor and left and right anchors of a VAS in accordance with some embodiments of the disclosed subject matter.

FIG. 6 illustrates the alignment of the left and right anchors in accordance with some embodiments of the disclosed subject matter. As shown in FIG. 6, the center pixel of the left anchor 610 (i.e., pixel three, if the anchor is five pixels wide, pixel two if the anchor is three pixels wide) aligns with the first pixel of the VAS line. The center pixel of the right anchor 620 (i.e., pixel three, if the anchor is five pixels wide, pixel two if the anchor is three pixels wide) aligns with the last pixel of the VAS line.

Placement of Numeric Labels for the Left and Right Anchors

In some embodiments, the VAS anchor display module 360 is configured to display numeric labels defining the values of the left and right anchors. Further, the VAS anchor display module 360 is configured to provide instructions for placing the numeric labels above, below or adjacent to the anchors, in an unambiguous manner, so that it is clear what the numeric labels refer to. For example, the VAS anchor display module 360 can be configured to provide instructions to center-justify the numeric labels above the anchors according to the following rules:

The left numeric anchor label should be centered horizontally above the first pixel of the VAS line.

The right numeric anchor label textbox should be centered above the last pixel of the VAS line.

Figure 7:
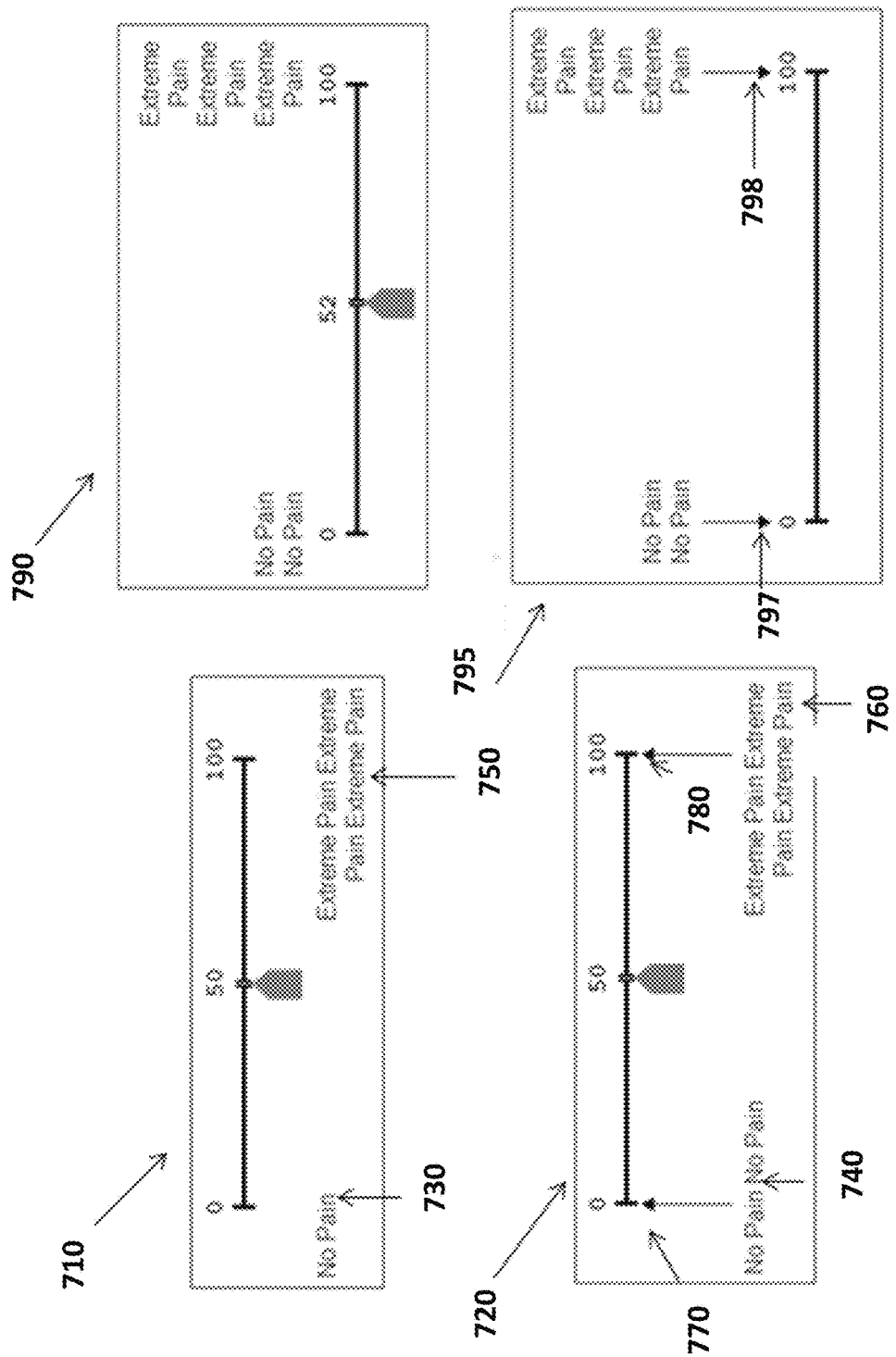
FIG. 7 illustrates a VAS in accordance with some embodiments of the disclosed subject matter.

FIG. 7 shows an illustration of VAS 710, 720, 790 and 795 in accordance with this embodiment.

Placement of Text Labels for the Left and Right Anchors

In some embodiments, the left and right anchors include text labels. Further, the VAS anchor display module 360 can be configured to provide instructions for positioning the text labels above or below the VAS line. In some cases, instructions for the placement of the text label will depend on its length. For example, VAS anchor display module 360 can be configured to provide instructions to screen edge justify the text labels according to the following rules:

The left text label should be justified to the left edge of the screen.

The right text label should be justified to the right edge of the screen.

If the left text label would extend beyond a predetermined right limit, then the text should be wrapped to multiple lines.

If the right text label would extend beyond a predetermined left limit, then the text should be wrapped to multiple lines.

The text labels that appear in FIG. 7 to label the anchor lines of VAS 710, 720, 790 and 795 are exemplary only and intended to illustrate wrapping text to multiple lines when the text labels are long. It will be apparent to one of skill in the art that any text label may be used to label the anchor lines.

FIG. 7 illustrates VAS 710 and 720, according to some embodiments of the disclosed subject matter, where the text labels for the VAS anchors are screen-edge justified. As shown in VAS 710 and 720, the left text labels 730 and 740 for the left anchors are justified to the left edge of the screen and fit on one line. In contrast, the right text labels 750 and 760 for the right anchors would exceed beyond a predetermined left limit from the start of the VAS line to the middle point of the VAS line, and therefore wrap around to multiple lines. The placement of the text label is important, because if it extends too close to the middle of the VAS line it may influence the subject to mark his response more towards the middle of the VAS line than he would if the text labels were narrowly wrapped over the anchor lines as shown in VAS 790 and 795.

Figure 8:
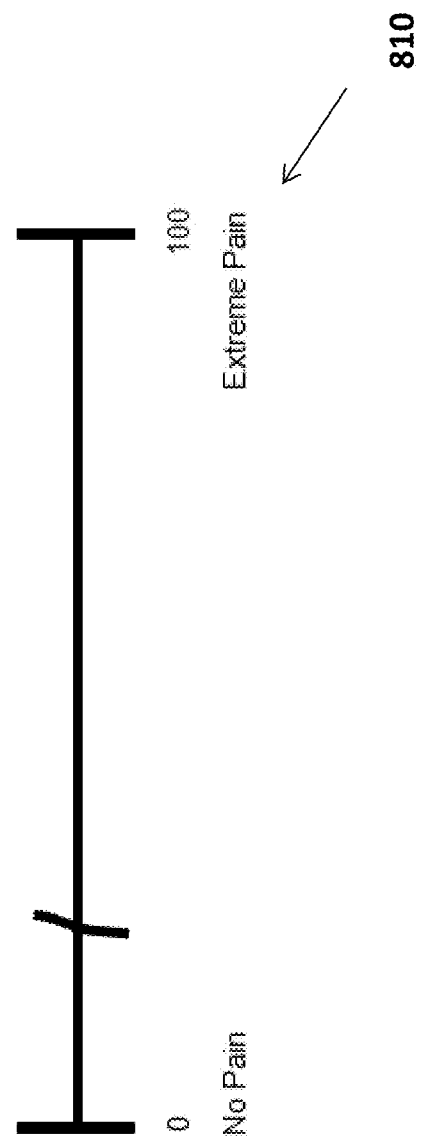
FIG. 8 illustrates a sample VAS in accordance with some embodiments of the disclosed subject matter.

In further embodiments, arrows 770 and 780 can be drawn from the labels to the endpoints to prevent labels that do not clearly indicate the endpoints, as shown in FIG. 7 in VAS 720. The purpose of the arrows is to make it clear that the labels refer only to the endpoints, and not to a range of values directly above the labels. If the endpoint labels would not clearly indicate that they correspond to the endpoints and not to a range of values, then the labels may lead to response bias when the subject selects a position along the VAS line. For example, the right text label 810 shown underneath the right anchor of the VAS illustrated in FIG. 8 could affect the subject's mark or placement of the cursor. A subject may assume from the label placement that "Extreme Pain" starts at around unit 85 on the VAS line and that the endpoint value 100 then equates to "Really, Really Extreme Pain."

Configuring consistent rules for the placement of labels in relation to the endpoints of the horizontal VAS will help offset the potential biasing effect that may occur if the text extends too far from the endpoints or do not clearly indicate what VAS values they are labeling. Similarly, the VAS Anchor Display Module 360 is configured to implement rules for text placement for a vertical embodiment of the VAS that limits the potential biasing effects of unclear text placement (e.g., limiting text wrapping, so that the endpoint labels do not extend too far into the center of the vertical VAS line).

In other embodiments, as shown in FIG. 7, by VAS 790 and 795, the VAS display module 340 can be configured to provide logic to center justify the text labels over the anchors. For example:

The left text anchor label should be centered horizontally above the first pixel of the VAS line.

The right text anchor label should be centered horizontally above the last pixel of the VAS line.

The left and right text label width should not extend more than 20 units along the VAS line (making the total width of the textbox not more than 40 VAS line units wide). For long text, the text should be wrapped to multiple short lines.

For clarity, arrows 797 and 798 can be drawn from the labels to the endpoints, as shown in VAS 795.

Design of the Unit Cursor

Also at step 430, the unit cursor display module 370 provides instructions for the dimensions and placement of the unit cursor on the VAS. In some embodiments, the unit cursor display module 370 can be configured to display a unit cursor on the VAS that allows a subject to indicate a response to a question by placing the unit cursor somewhere along the VAS line. The final resting point of the unit cursor should represent visually the closest subjective value approximation of the subject's response in proportion to the distance from the two extreme values at the ends of the VAS. The user may move the unit cursor via a touch screen (e.g., using a finger or a virtual stylus), touch pad, keyboard, mouse or other input device.

In some embodiments, the unit cursor will rest on the pixel column selected by the subject. In other embodiments, the unit cursor will rest at the center of the interval of distance selected by the subject, regardless of which pixel column in the interval of distance the subject selected.

In some embodiments, the equally sized targets along the VAS line, each corresponding to a score, can be configured by the unit cursor display module 370 so that tapping any pixel in the target area centers the unit cursor in the center of the selected target area and registers an integer score.

In some embodiments, the unit cursor display module 370 is configured to display the unit cursor at a fixed height (e.g., 33 pixels) regardless of the VAS dimensions and to center the unit cursor vertically on the VAS line. For example, if a unit cursor is 33 pixels high, the unit cursor display module 270 will display the unit cursor:
- 14 pixels above and 14 pixels below a VAS line five pixels high.
- 15 pixels above and 15 pixels below a VAS line three pixels high.

In some cases, the unit cursor display module 370 is configured to vary the width of the unit cursor based on the height of the VAS line. For example, the unit cursor width can be:
- Seven pixels wide for VAS lines five pixels high.
- Five pixels wide for VAS lines three pixels high.

In certain embodiments, the VAS unit cursor display module 370 is configured to provide logic about the position of the unit cursor when it is placed on either end of the VAS line. For example, when the unit cursor is placed on the left end of the VAS line:
- The center pixel of the unit cursor (pixel four, if the unit cursor is seven pixels wide, pixel three if the unit cursor is five pixels wide) should be directly over the first pixel of the VAS line, so as to center the unit cursor over the anchor line.
- The right side of the unit cursor should extend one pixel past the right side of the left anchor line and the left side of the unit cursor should extend one pixel past the left side of the left anchor line.

Further, when the unit cursor is placed on the right end of the VAS line:
- The center pixel of the unit cursor (pixel four, if the unit cursor is seven pixels wide, pixel three if the unit cursor is five pixels wide) should be directly over the last pixel of the VAS line.
- The right side of the unit cursor should extend one pixel past the right side of the right anchor line and the left side of the unit cursor should extend one pixel past the left side of the right anchor line, so as to center the unit cursor over the anchor line.

Figure 9:
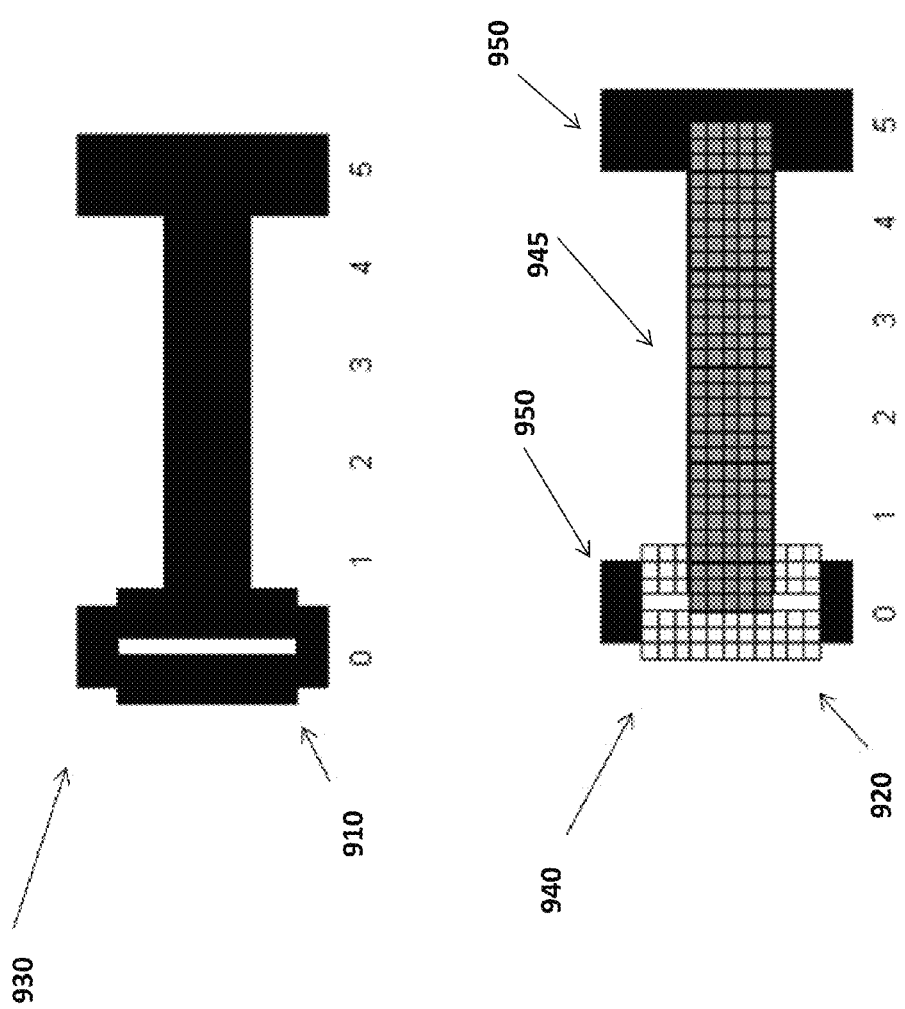
FIG. 9 illustrates the alignment of a VAS unit cursor in accordance with some embodiments of the disclosed subject matter.

In some embodiments, the unit cursor display module 370 is configured to generate a unit cursor having a center column of pixels that is a different color than the other columns of pixels (i.e., the fourth column of pixels, if the unit cursor is seven pixels wide, the third column of pixels if the unit cursor is five pixels wide) to act as the value indicator pixel. FIG. 9, in accordance with some embodiments, illustrates an embodiment where the center pixels of the unit cursor 910 and 920 are white to act as a unit indicator. This allows the subject to select a position on the VAS line with great precision (i.e., one pixel, the smallest unit of resolution). VAS 930, as shown in FIG. 9, includes a unit cursor 910, with its center pixel exactly on 0. VAS 930 is shown from the subject's perspective (i.e., the subject sees the unit indicator line up with the value 0, but does not see the alignment at a pixel level). FIG. 9 also illustrates VAS 940 with a unit cursor 920 on exactly 0 from the device's perspective (i.e., how the device knows in pixels where the unit cursor is and how it can calculate the distance from the first pixel on the VAS line 945 to the line pixel over which the center of the unit cursor is sitting). Further, the entire unit cursor can be a different color than the VAS line 945, as shown in VAS 940. The anchor lines 950 can also be a different color than the VAS line 945.

Figure 10:
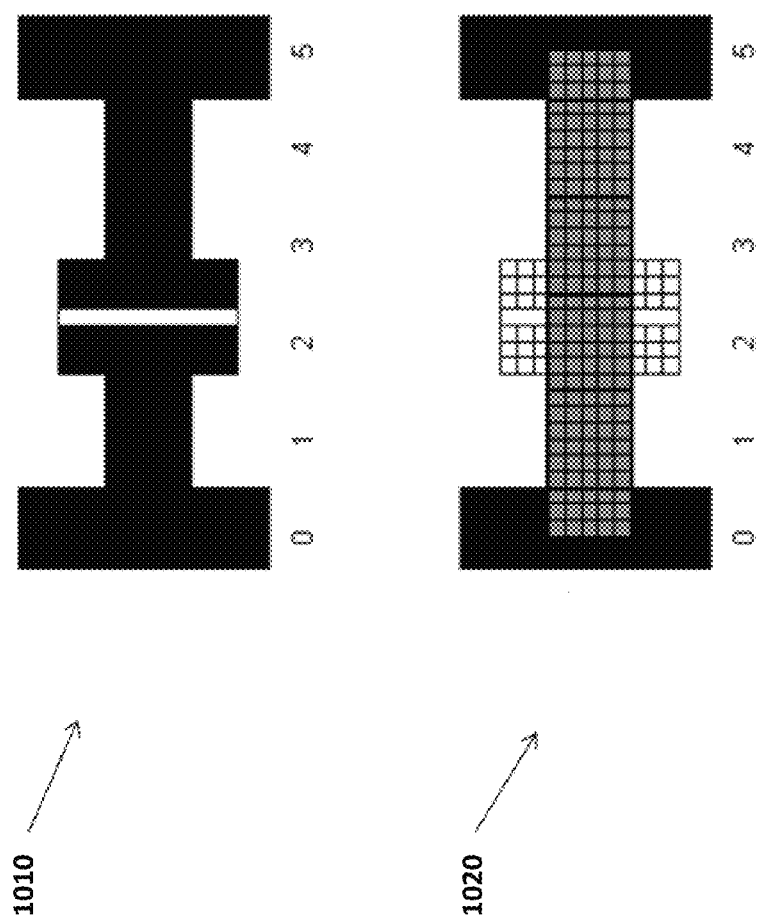
FIG. 10 illustrates the alignment of a VAS unit cursor in accordance with some embodiments of the disclosed subject matter.

FIG. 10, in accordance with some embodiments, shows VAS 1010 and 1020 including a unit cursor providing a value of two units, even though the unit cursor center pixel is not lined up over the pixel that is exactly 2.0. Each unit of the VAS 1010 and 1020 demarcates an interval of distance that includes one or more pixels, depending on the length of the VAS. The VAS 1010 (from the subject's perspective) and the VAS 1020 (from the device's perspective) demonstrate that whenever the unit cursor's center pixel is over any of the pixels that belong to a interval of distance associated with a unit, the value reported is that unit (and not a fraction of it).

Figure 11:
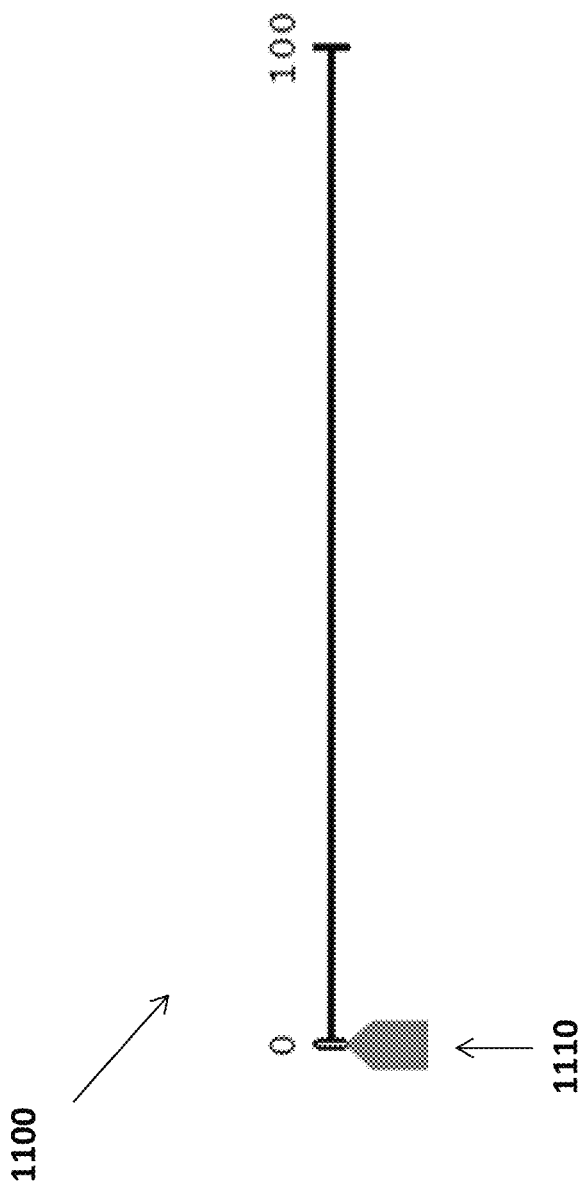
FIG. 11 illustrates a VAS comprising a pointer indicator in accordance with some embodiments of the disclosed subject matter.

In accordance with some embodiments, the unit cursor display module 370 is configured to generate a pointer indicator below the unit cursor to help the subject see and manipulate the placement of the unit cursor, as shown in FIG. 11. The pointer indicator acts like a virtual stylus and enables the subject to use a finger, yet have the control and precision of a physical stylus in marking the VAS. For touch screen computing devices, a pointer indicator 1110 below the unit cursor, which is aligned with the unit cursor, prevents a subject's finger from covering up the position on the VAS line where the subject wishes to place the unit cursor and gives the subject more precision and control. Validation studies on the sensitivity of VAS instruments have so far demonstrated equivalence between marking a VAS on paper with a pencil and marking a VAS on an electronic display with a stylus. These validation studies are described in Jaimson, Robert N. et al., "Comparative Study of Electronic Vs. Paper VAS Ratings: a Randomized, Crossover Trial Using Healthy Volunteers," Pain 99 (2002), 341-347 (which is expressly incorporated herein by reference).

The VAS Response Screen

Figure 12:
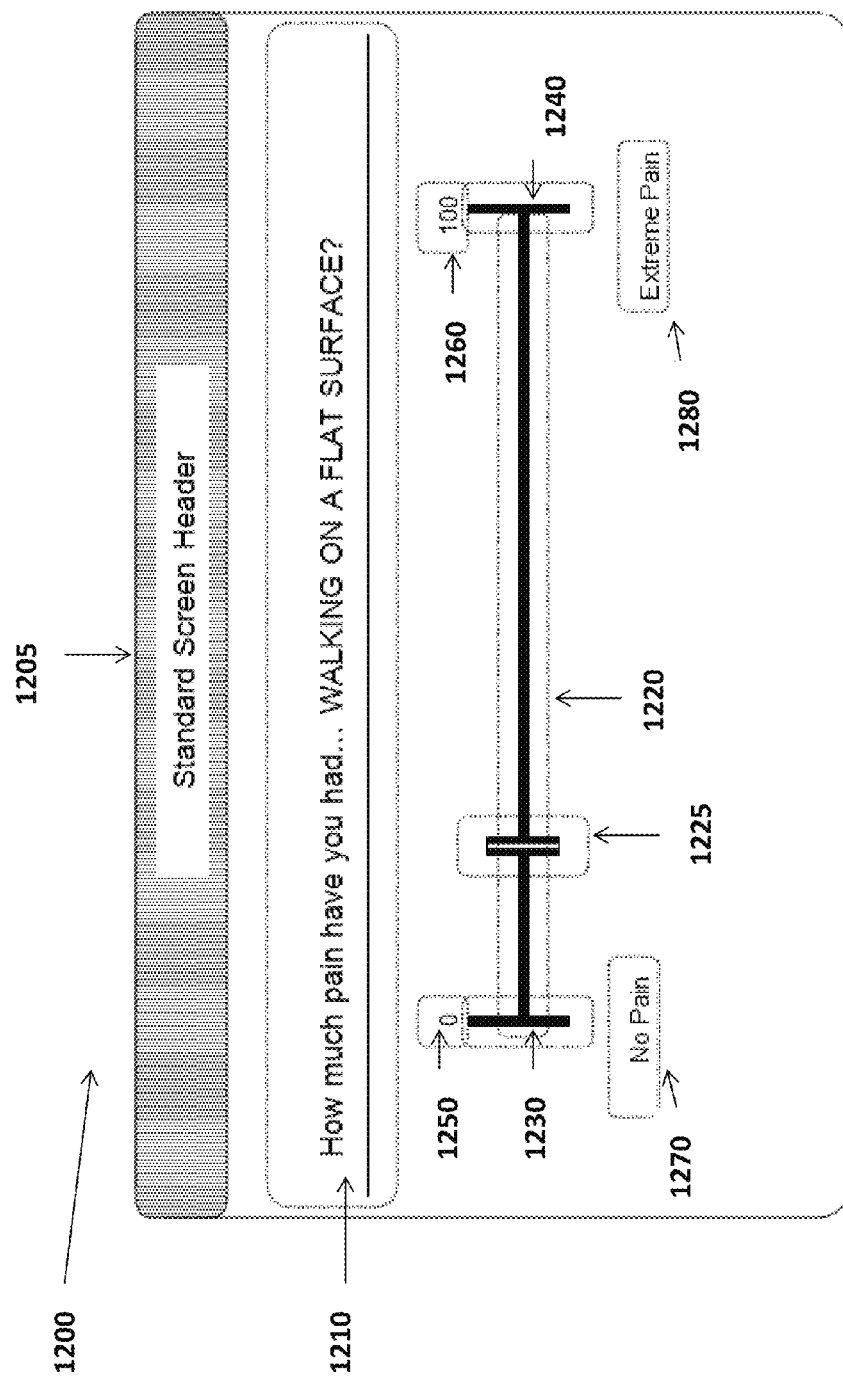
FIG. 12 illustrates a VAS template in accordance with some embodiments of the disclosed subject matter.

At step 440, the VAS display module 340 displays a VAS response screen. In some embodiments, the VAS display module 340 generates a template for placement of a VAS and other components of an assessment eliciting a VAS response from a subject. FIG. 12, illustrates a template 1200 for a VAS response screen according to some embodiments of the disclosed subject matter. The template includes a screen header 1205, a text box 1210 for containing the stem (e.g., question or response) for eliciting a VAS response by a subject. The text box 1210 is located above the VAS 1220 and takes up most of the available vertical space since the horizontal VAS 1220 does not take up a lot of vertical space. A sample question or request (i.e., stem) is displayed in text box 1210. The VAS display module 340 can be configured to center the VAS line vertically in the vertical space between the bottom of the question text and the bottom border of the display area. In another embodiment, the VAS display module 340 can be configured to center the VAS 1220 on a specific row of pixels so that it remains in the same place vertically for several stems, though those stems may have differing lengths of stem text (and, hence, different heights of stem text area).

The template also includes VAS unit cursor 1225, left anchor 1230 and right anchor 1240, the left and right endpoint numeric value labels, 1250 and 1260 respectively, for the VAS line and the left and right endpoint text labels, 1270 and 1280 respectively, for the VAS line.

Figure 13:
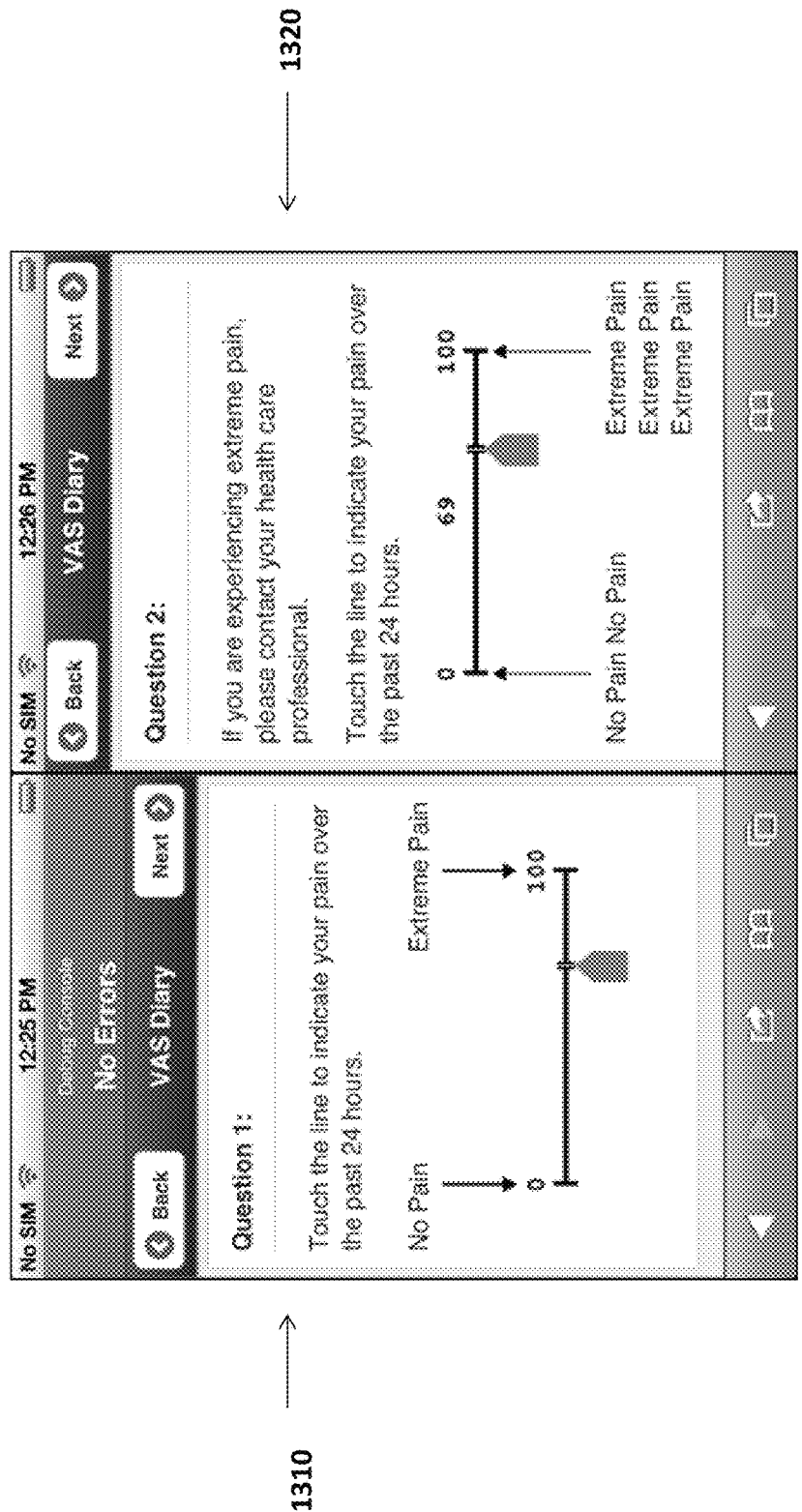
FIG. 13 illustrates a screen shot of a VAS response screen in accordance with some embodiments of the disclosed subject matter.

In some embodiments, the VAS display module 340 can be configured to generate different VAS templates for the VAS response screens and test VAS response screens. A screenshot of an example VAS response screen is shown in FIG. 13. Some example templates include:
1. VAS screen with screen edge anchor text labels and no score displayed when the user selects a pixel, interval of distance, or target area along the VAS line, as illustrated by VAS response screen 1310.
2. VAS screen with screen edge anchor text labels and score displayed when the user selects a pixel, interval of distance, or target area along the VAS line. The displayed score (e.g., 69) is illustrated by VAS response screen 1320.

3. VAS screen with center-justified anchor text labels and no scores displayed when the user selects a pixel, interval of distance, or target area along the VAS line.
4. VAS screen with center-justified anchor text labels and score displayed when the user selects a pixel, interval of distance, or target area along the VAS line.

For example, in an embodiment intended to test the accuracy of the VAS response, displaying the corresponding score as the unit cursor moves along the VAS line helps ensure that all score numbers appear and that they appear monotonically. Also, by tapping on different target areas of the VAS line and noting what score appears, a person testing the accuracy of the VAS display can confirm that the target areas along the VAS line are identical in size. In some embodiments, for example, when a VAS is used to indicate objective measurements such as recording a subject's temperature or blood pressure, then a score corresponding to the position of the unit cursor can be displayed as the subject moves the unit cursor along the VAS line and recorded when the user marks a position on the VAS line. This embodiment also enables a user to record a score using the VAS without manually entering the score with a numeric keyboard. In other embodiments, for example, where the mark is intended to represent a proportionate distance from an endpoint and not a discrete number, then a score may not be displayed.

Calculating the VAS Numeric Response Based on the Placement of the Unit Cursor

At step 450, the VAS response module 380 determines a VAS numeric response based on a subject's placement of the unit cursor on the VAS. In some embodiments, the VAS response module 380 is configured to determine the pixel indicated by the unit cursor center and calculate how far it is, in number of pixels, from the starting pixel.

Math·ceil((where the unit cursor center pixel is −(vas line start point−1)−the number of pixels reserved for the left anchor)/unit pixel size For example, if the pixel location of the center of the unit cursor is pixel 400, the VAS response module 380 applies the following mathematical formula:

Pixel 400(i.e., the location on the screen of the unit cursor center pixel)−(384−1)(i.e., the location on the screen of the first pixel on the VAS line−1)=17 pixels.

Figure 14:
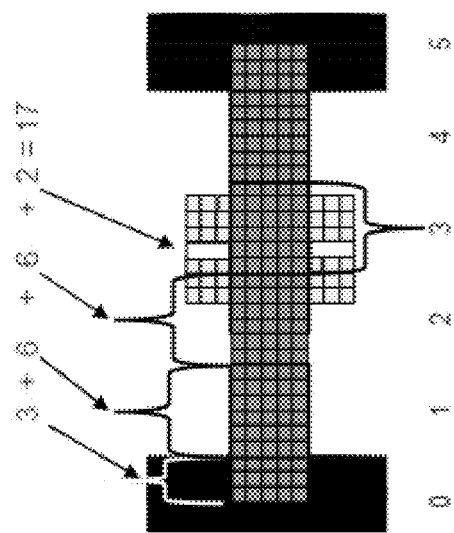
FIG. 14 illustrates a VAS in accordance with some embodiments of the disclosed subject matter.

Next, the VAS response module 380 subtracts the number of pixels reserved for the left anchor from the result. The first unit has only half the pixels of the other units, because the other half of pixels is reserved for the left anchor line. For example, as shown in FIG. 14, each unit has 6 pixels. Therefore, in the example illustrated in FIG. 14, the VAS response module 380 subtracts three pixels reserved for the left anchor from the result:

17 pixels−3 pixels=14 pixels

Next, the VAS response module 380 divides the result by the number of pixels in a single interval of distance, and rounds up to the next integer value (mathematically this is called taking the ceiling of the result). Turning again to the example shown in FIG. 14:

CEILING(14 pixels/6 pixels in a single distance of unit)=2.33 ROUNDED UP=3.

Applying the formula above, the VAS response module 380 will report three when the center pixel of the unit cursor lands on pixel 17.

In the foregoing description, certain steps or processes can be performed on particular servers or as part of a particular engine. These descriptions are merely illustrative, as the specific steps can be performed on various hardware devices, including, but not limited to, server systems and/or mobile devices.

The invention claimed is:

1. A system for displaying a non-biasing, self-adjusting visual analog scale comprising:
   a screen display;
   one or more computer processors; and
   a non-transitory computer-readable medium comprising instructions operable, when executed by the one or more computer processors, cause the system to:
   determine a number of pixels available on the screen display to display the visual analog scale;
   generate the visual analog scale comprising equal intervals of distance to fit the number of pixels available on the screen display, wherein the visual analog scale comprises a first target area and a second target area, wherein the first target area and the second target area corresponds to a unit number on the visual analog scale, wherein the first target area and the second target area are equally sized; and
   display the visual analog scale on the screen display.

2. The system of claim 1, wherein the instructions, when executed by the one or more processors, further cause the system to generate a unit cursor for indicating a position on the generated visual analog scale.

3. The system of claim 2, wherein the instructions, when executed by the one or more processors, further cause the system to determine in pixels a position of the unit cursor in relation to a starting unit of the visual analog scale and to generate a unit number that corresponds to the position.

4. The system of claim 1, wherein the instructions, when executed by the one or more processors, further cause the system to generate the visual analog scale to measure a range across a continuum between two extremes, wherein each of the two extremes is represented as an endpoint on the visual analog scale.

5. The system of claim 4, wherein the instructions, when executed by the one or more processors, further cause the system to generate an anchor line indicating a value at each of the endpoints of the visual analog scale.

6. The system of claim 1, wherein the instructions, when executed by the one or more processors, further cause the system to generate a visual analog scale that is divided into 100 equal intervals of distance.

7. The system of claim 1, wherein the instructions, when executed by the one or more processors, further cause the system to display the visual analog scale on the screen display in at least one of a vertical and horizontal orientation.

8. The system of claim 5, wherein the instructions, when executed by the one or more processors, further cause the system to:
   generate a first text label for a first anchor line of the visual analog scale; display the first text label on two or more lines of the screen display when the length of the first text label exceeds a first predetermined threshold;
   generate a second text label for a second anchor line of the visual analog scale; and
   display the second text label on two or more lines of the screen display when the length of the second text label exceeds a second predetermined threshold.

9. The system of claim 8, wherein the first and second predetermined thresholds are the same.

10. A computer-implemented method for displaying a non-biasing, self-adjusting visual analog scale comprising:
- determining a number of pixels available on a screen display to display a visual analog scale;
- receiving the available number of pixels from the screen dimension;
- generating the visual analog scale comprising equal intervals of distance to fit the number of pixels available on the screen display, wherein the visual analog scale comprises a first target area and a second target area, wherein the first target area and the second target area corresponds to a unit number on the visual analog scale, wherein the first target area and the second target area are equally sized; and
- displaying the visual analog scale on the screen display.

11. The computer-implemented method of claim 10, further comprising:
- generating a unit cursor for indicating a position on the generated visual analog scale.

12. The computer-implemented method of claim 11, further comprising:
- determining in pixels, a position of the unit cursor in relation to a starting unit of the visual analog scale and generating a unit number corresponding to the position.

13. The computer-implemented method of claim 10, wherein generating the visual analog scale further comprises measuring a range across a continuum between two extremes, wherein each of the two extremes is represented as an endpoint on the visual analog scale.

14. The computer-implemented method of claim 13, further comprising generating an anchor line indicating a value at each of the endpoints of the visual analog scale.

15. The computer-implemented method of claim 10, further comprising generating a visual analog scale that includes 100 equal intervals of distance.

16. The computer-implemented method of claim 10, further comprising displaying the visual analog scale on the screen display in at least one of a vertical and horizontal orientation.

17. The computer-implemented method of claim 14, further comprising:
- generating a first text label for a first anchor line of the visual analog scale; displaying the first text label on two or more lines of the screen display when the length of the first text label exceeds a first predetermined threshold;
- generating a second text label for a second anchor line of the visual analog scale; and displaying the second text label on two or more lines of the screen display when the length of the second text label exceeds a second predetermined threshold.

18. The computer-implemented method of claim 17, wherein the first and second predetermined thresholds are the same.

* * * * *